US006181778B1

(12) United States Patent
Ohki et al.

(10) Patent No.: US 6,181,778 B1
(45) Date of Patent: Jan. 30, 2001

(54) CHRONOLOGICAL TELEPHONE SYSTEM

(75) Inventors: Masaru Ohki, Tokorozawa; Hirohiko Sagawa, Kokubunji, both of (JP); Tomoko Sakiyama, Chicago, IL (US); Hisashi Ikeda, Kokubunji (JP); Hiromichi Fujisawa, Tokorozawa (JP); Nobuo Hataoka, Tsukui-gun (JP); Youichi Kaneko, Kodaira (JP)

(73) Assignee: Hitachi, Ltd., Tokyo (JP)

( * ) Notice: Under 35 U.S.C. 154(b), the term of this patent shall be extended for 0 days.

(21) Appl. No.: 09/029,557

(22) PCT Filed: Aug. 30, 1995

(86) PCT No.: PCT/JP95/01723

§ 371 Date: Feb. 26, 1998

§ 102(e) Date: Feb. 26, 1998

(87) PCT Pub. No.: WO97/08895

PCT Pub. Date: Mar. 6, 1997

(51) Int. Cl.[7] .................................................. H04M 11/00
(52) U.S. Cl. .............................. 379/52; 348/14; 348/704; 348/271
(58) Field of Search .................................. 379/52, 93.15; 340/825.19; 382/100; 704/2, 3, 271, 277, 235, 260; 348/14, 15

(56) References Cited

U.S. PATENT DOCUMENTS

| 5,146,502 | * | 9/1992 | Davis | 379/52 |
| 5,283,833 | * | 2/1994 | Church et al. | 379/52 |
| 5,524,137 | * | 6/1996 | Rhee | 379/88.01 |
| 5,982,853 | * | 11/1999 | Liebermann | 704/271 |

FOREIGN PATENT DOCUMENTS

| 0560587 A2 | 9/1993 | (EP) . | |
| 406337627A | * 12/1994 | (JP) | G09B/21/00 |
| 07-075075 | 3/1995 | (JP) . | |
| 407075075A | * 3/1995 | (JP) | H04N/7/14 |

OTHER PUBLICATIONS

M. Ohki, et al, "Sign Language Translation System Using Pattern Recognition and Synthesis", Hitachi Review, vol. 44, Nno. 4, Aug. 1, 1995, pp. 251–251.

"Methodology and Apparatus for Translation of Text to Sign Language Images", IBM Technical Disclosure Bulletin, vol. 37, No. 4A, Apr. 1, 1994, p. 229.

\* cited by examiner

*Primary Examiner*—Huyen Le
*Assistant Examiner*—Melur Ramakrishnaiah
(74) *Attorney, Agent, or Firm*—Antonelli, Terry, Stout & Kraus, LLP

(57) ABSTRACT

A sign language telephone device is offered which enables an aurally handicapped person who uses the sign language to converse with a normal person at a distant place who does not know the sign language. The sign language telephone device is placed on the side of the aurally handicapped person, and hand gestures of the sign language inputted from a sign language input means are recognized as the sign language, and the recognized sign language is translated to Japanese. The translated Japanese word train is converted to synthesized voices and it is transmitted to a videophone on the side of a normal person. The voices from the videophone are recognized, and the recognized Japanese is translated to the sign language to generate sign language animations and they are displayed on the screen of a TV set on the side of the aurally handicapped person. According to the present invention, it is made possible for an aurally handicapped person to have conversation easily with a normal person at a distant place who does not know the sign language through an existing network.

33 Claims, 15 Drawing Sheets

CHRONOLOGICAL TELEPHONE SYSTEM

TECHNICAL FIELD

The present invention relates to a sign language telephone device to be used in a case where an aurally handicapped person talks with a normal person in a distant place who does not know the sign language.

BACKGROUND ART

The sign language has been developed to contrive the communication between aurally handicapped persons. By using the sign language, an aurally handicapped person is able to converse directly with another aurally handicapped person being close to him or her with hand gestures, body gestures, face expressions, etc. In a case of the communication between aurally handicapped persons being apart from each other, the transmission of will was possible in realtime by performing sign language gestures using videophone devices.

On the other hand, recently, researches on sign language translation system have been actively performed so that an aurally handicapped person who uses sign language is able to converse with a normal person who does not know the sign language (Reference: Masaru Oki, Hirohiko Sagawa, Tomoko Sakiyama, Eiji Ohira, Hiromichi Fujisawa: Information Processing Media Research Society, 15-6, Information Processing Society of Japan, 1994). The sign language translation system is composed of a sign-language-to-Japanese-translation-subsystem and a Japanese-to-sign-language-translation-subsystem.

(1) The sign-language-to-Japanese-translation-subsystem is composed of a sign language recognition unit which recognizes the sign language and translates it to a sign language word train, and a sign-language-to-Japanese-translation-unit which translates the recognized sign language words to Japanese. In the sign language recognition unit, the gestures of hands are inputted using a glove-based input, the input hand gesture is compared with a standard hand gesture and a sign language word which has the closest standard hand gesture is selected. The sign-language-to-Japanese-translation-unit translates a sign language word train to Japanese using a correspondence table between sign language words and Japanese words and a conversion rule from a sign language sentence to a Japanese sentence.

(2) Japanese-to-sign-language-translation-subsystem is composed of Japanese to the sign language translation unit which translates Japanese to the sign language, and a sign language generation unit which displays the sign language as an animation using 3 dimensional computer graphics. The Japanese-to-sign-language-translation-unit analyzes Japanese and translates Japanese to a sign language word train using a correspondence table between Japanese words and the sign language words and a conversion rule from Japanese sentences to sign language sentences. The sign language generation unit generates sign language animations using a (sign language words)-(animation data) dictionary which stores sets of indexes of sign language words and the corresponding data of gestures of hands or countenances which are registered beforehand. In the generation of a sign language animation, the sign language animation data corresponding to the sign language words in a sign language word train are retrieved, and a human body model moves based upon the retrieved data. The movement of the model is made to be seen continuous by interpolating the gaps between the sign language words.

However, the sign language translation system is basically developed for the direct communication between an aurally handicapped person and a normal person being close to each other, so that it is not shown how to simply apply the configuration for a long distance call (conversation).

If the conventional sign language translation system is enlarged to apply to a long distance call, several controversial points will be produced.

In the first place, there will be a problem which makes the configuration of a device a large scaled and complicated one. To begin with, the above-mentioned sign language translation system is supposed to be a stand-alone type system, and in a case where it is enlarged to be applied to a long distance call, as an ordinary form, the following form can be considered: the sign-language-to-Japanese-translation-subsystem and the Japanese-to-sign-language-translation-subsystem are separately composed and these systems are connected to each other through a network.

However, in the case of the sign-language-to-Japanese-translation-subsystem and the Japanese-to-sign-language-translation-subsystem in a conventional sign language translation system, the dictionary data base or the correspondence table between the sign language words and Japanese words in the sign-language-to-Japanese-translation-unit (Japanese-to-sign-language-translation-unit) are commonly used in order to economize in the storage capacity.

For example, for the sake of long distance calls, if the sign-language-to-Japanese-translation-subsystem and the Japanese-to-sign-language-translation-subsystem are made to be separated and independent from each other and the sign-language-to-Japanese-translation-subsystem is provided on the side of an aurally handicapped person and the Japanese-to-sign-language-translation-subsystem is provided on the side of a normal person, then the identical data for translation have to be provided in duplication, which will naturally make the device configuration a large scaled and complicated one.

In the second place, there is another problem in that it is difficult to use an existing network for long distance calls (conversation). In a case where the sign-language-to-Japanese-translation-subsystem is provided on the aurally handicapped person side and the Japanese-to-sign-language-translation-subsystem is provided on the normal person side, it is necessary to transmit translated Japanese sentences or sign language animations to the other subsystem with each other. In particular, the transmission of sign language animations accompanies the transmission of a large quantity of images, so that for the execution of long distance calls enough preparations of the infrastructure of the network is needed, the network which is able to cope with the high speed transmission of a large capacity of data. Image transmission is possible with the present videophone facilities; however, in the case of the sign language, unless the subtle form and movement of hands, etc. are accurately transmitted and displayed, misunderstandings or erroneous recognition may be caused, which may give occasion to a trouble in communication.

Therefore, up to now, for an aurally handicapped person who uses the sign language, there has been no means to have conversation easily with a normal person in a distant place who does not know the sign language. Accordingly, they communicated to each other in transmitting characters or pictures using facsimile. Therefore, for an aurally handicapped person who wants to talk with the sign language, there have been some troubles to communicate with a normal person in a distant place who does not know the sign language.

The purpose of the present invention is to offer a simple device with which an aurally handicapped person who uses the sign language is able to communicate with a normal person in a distant place who does not know the sign language.

Another purpose of the present invention is to offer a device which makes an aurally handicapped person who uses the sign language possible to communicate with a normal person in a distant place who does not know the sign language through an existing network.

DISCLOSURE OF INVENTION

The present invention proposes a new concept called a sign language telephone device. In short, the present invention allows an aurally handicapped person who uses the sign language to communicate with a normal person in a distant place who does not know the sign language using the infrastructure of the existing videophone facilities. In the case of the present invention, the videophone on the side of an aurally handicapped person who uses the sign language is provided with both sign-language-to-Japanese-translation-function and Japanese-to-sign-language-translation-function and it is connected to the videophone on the side of a normal person through a network.

In the present invention, a videophone device having a sign language translation function to be used by an aurally handicapped person (sign-language-to-Japanese-translation-function and Japanese-to-sign-language-translation-function) is called a sign language telephone device, and an ordinary videophone device used by a normal person is called a videophone device on the normal person side. The present invention makes it possible to have conversation between a sign language telephone device and a videophone device on the side of a normal person in performing sign language translation.

The framework of the whole system according to the present invention is fundamentally constituted with 3 elements, a sign language telephone device, a network and a videophone device; however, one of the features of the present invention is in that various functions are concentrated in the sign language telephone device.

The sign language telephone device comprises several characteristic means such as a sign language input means, a videophone connection means, the sign-language-to-Japanese-translation-subsystem, and the Japanese-to-sign-language-translation-subsystem, besides a TV set, camera, microphone, and videophone control device which are found in an ordinary videophone device.

Supposing a case where an aurally handicapped person actually calls a normal person in a distant place on a sign language telephone device, the fundamental operation of the present invention will be explained.

An aurally handicapped person dials the telephone number of a normal person on the other end of the line, and when the normal person comes to the phone, the aurally handicapped person starts to communicate with him. In that case, the aurally handicapped person inputs the sign language through the sign language input means in the sign language telephone device, and the input sign language is recognized by the sign-language-to-Japanese-translation-subsystem and translated to a sign language word train and further translated to Japanese. The translated Japanese is outputted to the videophone device on the side of a normal person through a videophone connection means and a network (public network) as a synthesized voice. On the videophone device on the side of a normal person, an actual image inputted by a camera in the sign language telephone device on the side of an aurally handicapped person is displayed. In the case where voice is synthesized, corresponding to the aurally handicapped person, the voice can be adjusted: man's voice or woman's voice, quality of voice, speed of speaking, loudness of voice, high voice or low voice, etc. can be selected. In the case of a female aurally handicapped person, naturally female voice is desirable as a synthesized voice. In the case of a young person, a high tone voice might be desirable. The tones of Japanese voice, which is the result of translation of the sign language of an aurally handicapped person, can be used to specify an aurally handicapped person.

On the side of a normal person, the response is given to a videophone device with voice, and the voice transmitted through a network (a public network) a videophone connection device in a sign language telephone device is recognized in the Japanese-to-sign-language-translation-subsystem and the recognized Japanese is translated to the sign language, and the translated sign language is expressed as a sign language animation and displayed on the TV set.

The above-mentioned procedures are repeated, and the aurally handicapped person responses in the sign language, and the normal person basically responses in voice. In the case where a normal person calls an aurally handicapped person on a videophone, the procedures are almost the same as the above-mentioned case except the way of dialing at first.

In the case of the communication using the sign language as described in the above, some more contrivances are necessary.

In a first place, in the sign-language-to-Japanese-translation-subsystem, it is made possible to select a translation mode or a non-translation mode.

For an aurally handicapped person sign language is the means of communication, so that there is a fear that all hand gestures may be recognized as the gestures for communication. While a sign language telephone device is being used, the movement of hands not included in the sign language, for example, the movement of a hand for drinking coffee, may be recognized as a gesture in the sign language. In contrast to this, in the translation mode in the present invention, the movement of hands are translated to the sign language, but in the non-translation mode the movement of hands is not translated. The methods of changeover between the translation mode and non-translation mode are shown below.

(1) A method performed with a button, (2) A method in which non-translation mode is selected when the face is not looking forward, (3) A method in which the translation mode and the non-translation mode can be changed over by performing a predetermined special hand gesture, (4) A method in which the non-translation mode is selected when at least a hand is placed at the home position, etc. can be considered.

In a second place, at the videophone device on the side of a normal person, not only the actual image but also the animation can be displayed. When an aurally handicapped person talks with a normal person whom the aurally handicapped person does not know well, in most cases the aurally handicapped person is reluctant to show his or her actual image. In particular, in the case of a female person, in many cases she feels resistance to show her actual image when the call is from a stranger. Therefore, the sign-language-to-Japanese-translation-subsystem comprises a conversion means to convert the input hand gesture data to a sign language animation using the hand gestures inputted from the sign language input means and the expressions of the face which is taken in from a camera and recognized. In the image mode, the actual image data from the camera are displayed and in the animation mode, the sign language animation is displayed for the protection of privacy.

In a third place, the display on the sign language telephone device on the side of an aurally handicapped person and the display on the videophone device on the side of a normal person are synchronized. It takes time to translate the sign language of an aurally handicapped person to Japanese. Thereby, there is probability that the actual image of an aurally handicapped person and the voice and character train of Japanese translated from the sign language of an aurally handicapped person are displayed discontinuously and asynchronously on the time axis on the screen of a videophone device on the side of a normal person. The present invention comprises a means to display in making them synchronized.

It also takes time to recognize the spoken Japanese of a normal person, convert it to a character train, and convert it to a sign language animation. Thereby, there is probability that the actual image of the normal person sent to the screen of the sign language telephone device on the side the aurally handicapped person and the displayed sign language animation obtained in translating the spoken Japanese of the normal person are displayed discontinuously and asynchronously on the time axis. The present invention comprises a means to display in making them synchronized.

To be concrete, the actual image is given a time stamp and the time stamp is adjusted to a time stamp given to the translated and displayed image for synchronization.

For example, in a case of direct conversation without using sign language telephone device, the periods of time needed are as shown below:

0.0 sec to 2.0 sec [sign language] Good morning!,
2.0 sec to 5.0 sec [sign language] How are you?,
5.5 sec to 8.0 sec [voice] I'm fine.

When the conversation of an aurally handicapped person by way of the sign language comes to a stop, the conversation with the voice of a normal person is started. Assuming that the translation in the sign language telephone device is started after the finish of conversation, the result of translation of the sign language conversation of 0.0 sec to 2.0 sec is, for example, delivered to the videophone as a synthesized voice during 2.0 sec to 4.0 sec.

0.0 sec to 2.0 sec [sign language] Good morning!
2.0 sec to 4.0 sec [synthesized voice] Good morning!
2.0 sec to 5.0 sec [sign language] How are you
4.0 sec to 7.0 sec [synthesized voice] How are you?
7.0 sec to 10.0 sec [voice] I'm fine.
10.0 sec to 13.0 sec [sign language animation] I'm fine.

If the actual image is transmitted to the videophone device on the side of a normal person without synchronizing, the gesture "Good morning!" is sent at first and at the time when the gesture "How are you" is performed the sign language "Good morning" is displayed as a synthesized voice being translated, and the actual image and the synthesized voice, a result of translation, are deviated in point of time from each other. It gives a receiver some incongruous feeling, so that it is desirable that the actual image and the synthesized voice, a result of translation, are synchronized. In the present invention, the actual image and the conversation in the sign language are recorded together with time and the result of translation of sign language is given the time when the sign language is actually performed. In order to make the time coincide with time in real time, the actual image and the synthesized voice are synchronized and after that they are transmitted to the videophone device on the side of the normal person. About the actual image and voice sent from the side of a normal person, in the similar way, time is recorded. When the voice is recognized and translated to the sign language, and displayed as an animation, the actual image and the sign language animation are synchronized by utilizing time and then they are displayed. When they are synchronized, in some cases, the shortage of actual images or of time to display occurs. In the present invention, when the actual images to display are not enough, a still picture at the time when the shortage is made clear is displayed. When the display time is not enough, rapid traverse of the actual image is performed or display is not displayed.

In a fourth place, as a means for a response message to a telephone call when no body is in, the present invention comprises a means to prepare a message in combining some selected out of voices, images, characters or sign language animations. In this case too, as mentioned in the second feature, it is an effective way to prepare response when no body is in using an animation without using an actual image from the point of view of protecting privacy.

In a fifth place, the present invention comprises a means to display characters, which are the results of recognition of the voice of a normal person, together with a character train which is obtained by translating the result of recognition of sign language into Japanese on the videophone on the side of a normal person. Thereby, on the side of a normal person, it is made possible to confirm whether the contents of conversation spoken by him or her is correctly transmitted to a sign language telephone device or not.

The further objects or configuration will be made clear with the explanation about the embodiments shown in the following.

BEST MODE FOR CARRYING OUT THE INVENTION

Figure 1:
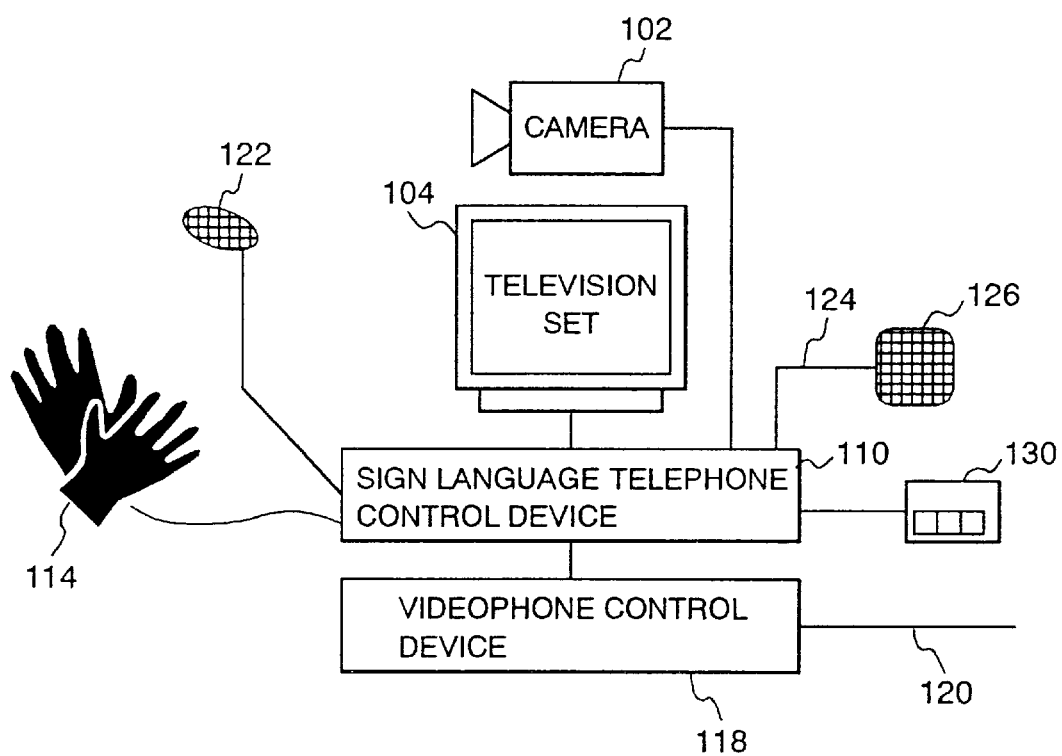
FIG. 1 shows the block diagram of the hardware of a sign language telephone device showing an embodiment according to the present invention.
Figure 2:
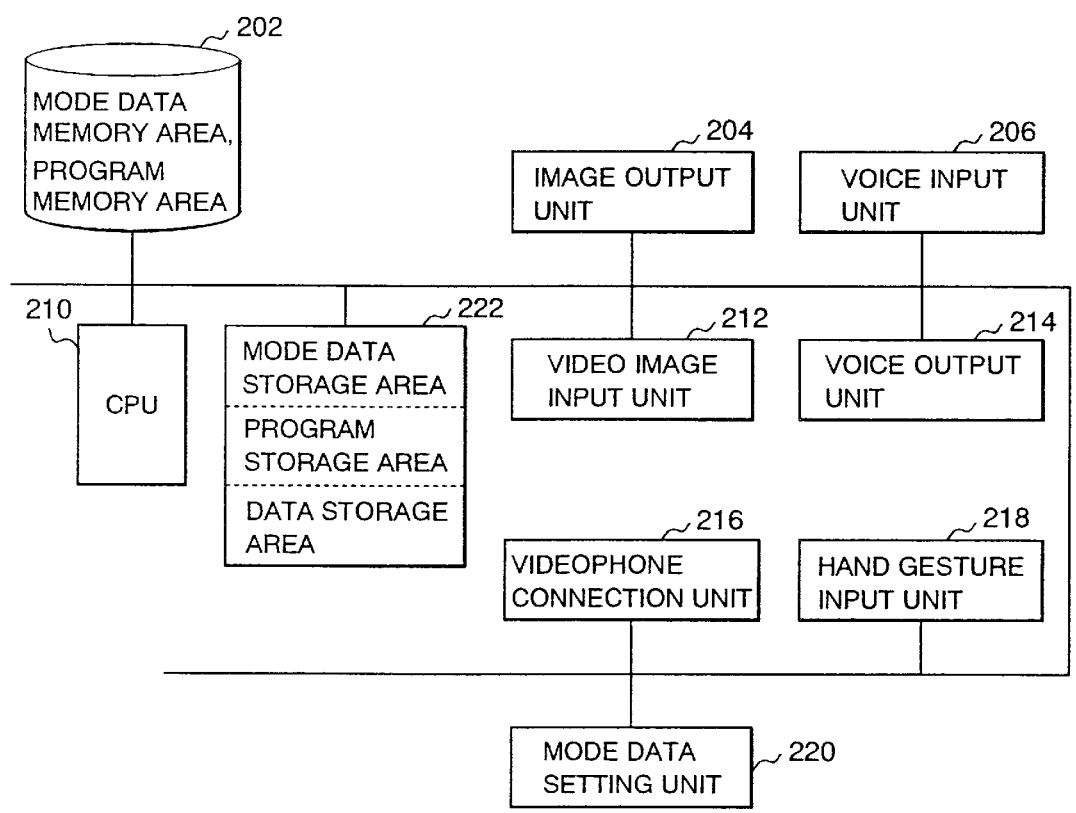
FIG. 2 shows the system block diagram of a sign language telephone control device.
Figure 3:
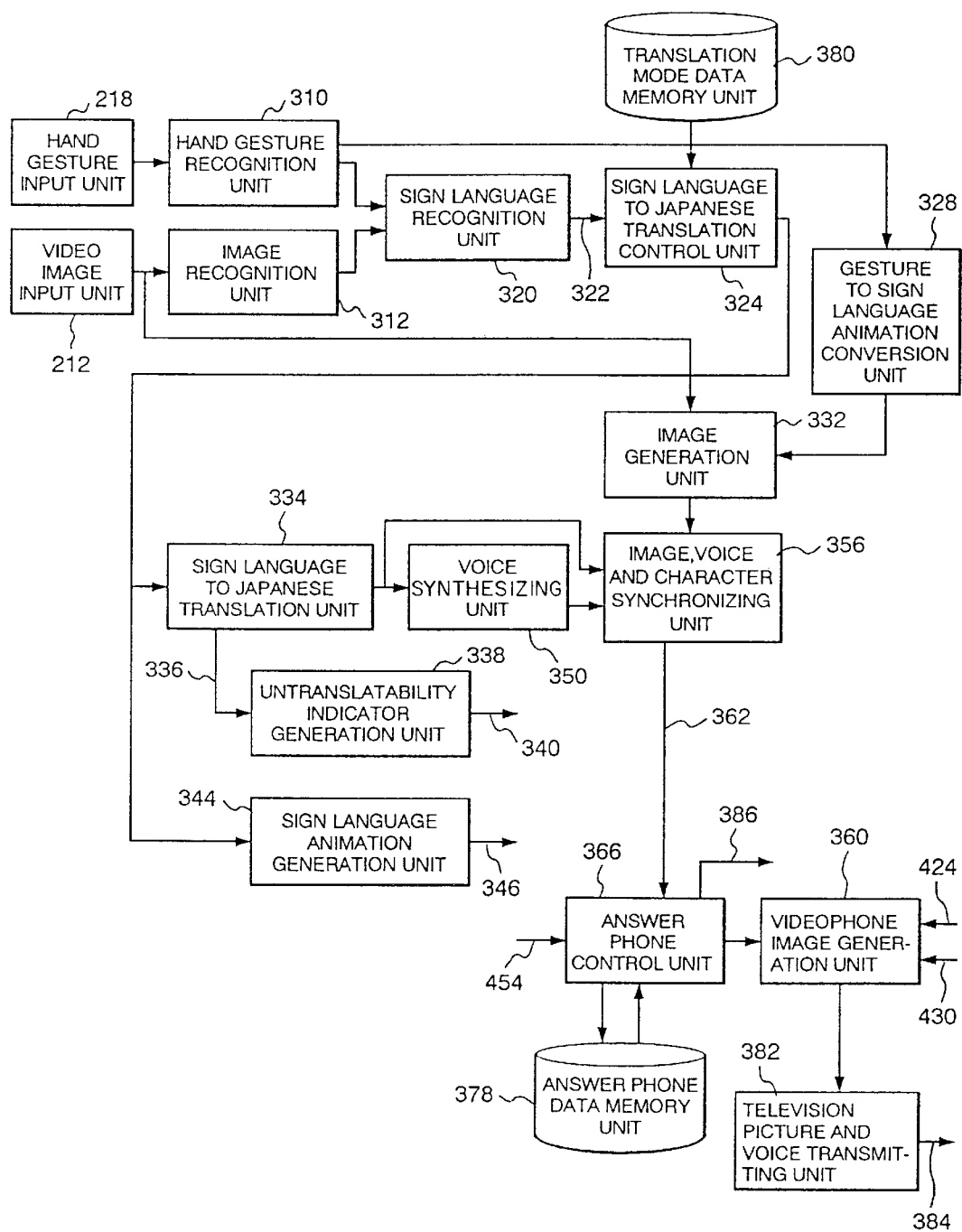
FIG. 3 shows the software block diagram of the sign-language-to-Japanese-translation-subsystem.
Figure 4:
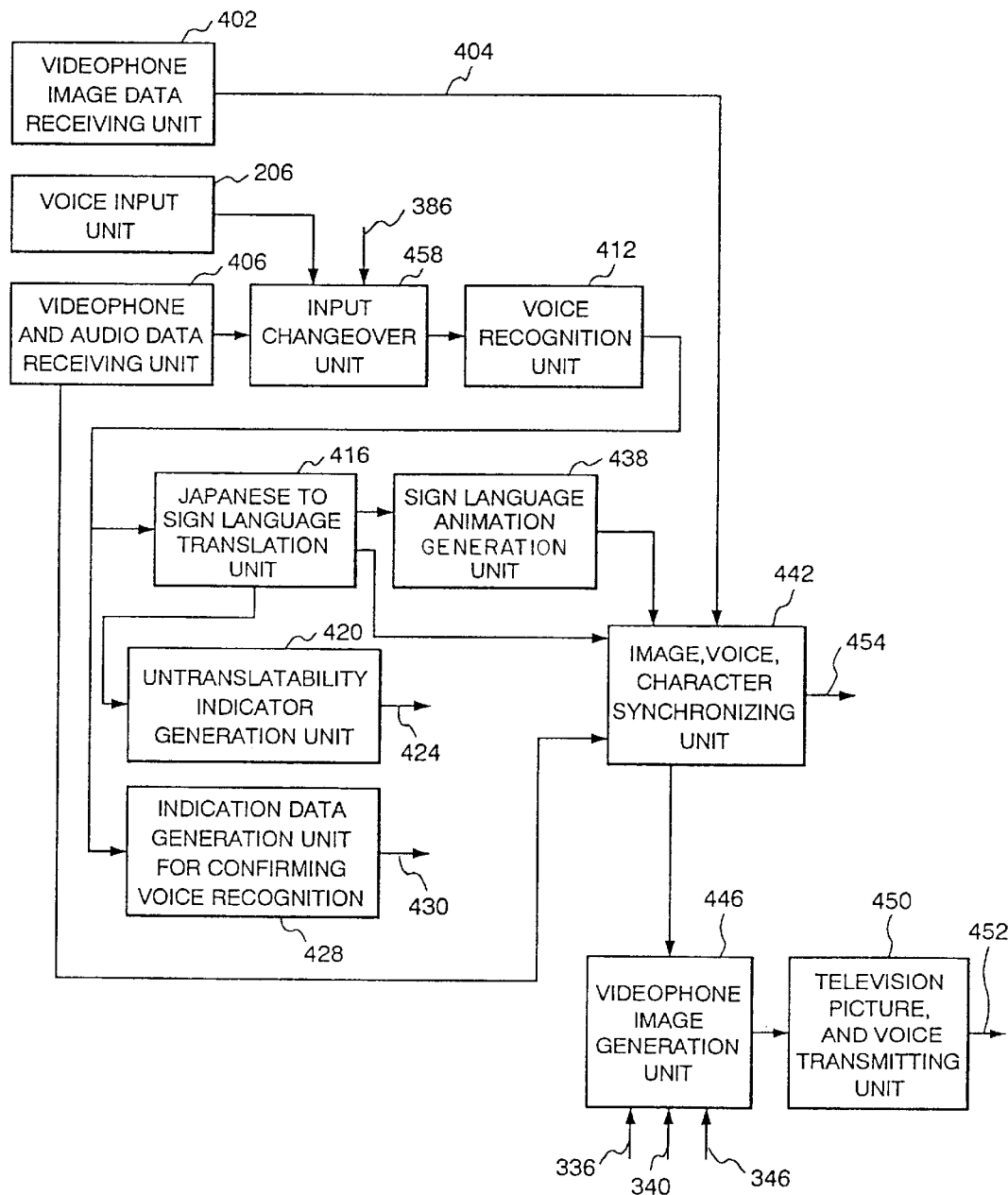
FIG. 4 shows the software block diagram of the Japanese-to-sign-language-translation-subsystem.

In the following, the present invention will be explained referring to drawings. FIG. 1 shows the hardware block diagram of a sign language telephone device, and FIG. 2 shows its system block diagram. FIG. 3 and FIG. 4 show software module block diagrams of a sign language telephone device.

In FIG. 1, a TV set 104, a camera 102, a microphone 122, a speaker 126 and a mode switch 130 are connected to the sign language telephone device 110. Hand gestures performed by an aurally handicapped person are inputted to the sign language telephone control device using a special glove (for example, Data Glove (the trademark of VPL Research Inc. a device for inputting the shape or position of hands) 114. The sign language telephone control device 110 generates voices and images to communicate with a videophone device on the side of a normal person and send them to the videophone control device 118. The videophone control device 118 regards images and voices sent from the sign language telephone control device 110 as the images and voices sent from a camera 102 or microphone, 122 and sends them to a videophone device on the side of a normal person through a telephone line 120 which forms a network (public network). The images and voices sent from the videophone device on the side of a normal person are received by the videophone control device 118 through the telephone line 120 and then are sent to the sign language telephone device 110. The mode switch 130 sets the translation mode of the sign language and the picture mode to be displayed on a videophone device on the side of a normal person. The videophone device on the side of a normal person is an ordinary videophone having no sign language translation function and being provided with a control table (or a keyboard) equipped with a TV set, camera, microphone, speaker and a group of switches, and comprises a videophone control device.

The sign language telephone control device 110 comprises the functions of translating the sign language to Japanese (the sign-language-to-Japanese-translation-subsystem) shown in the following among the basic sign language functions.

(1) A function to recognize the sign language performed by an aurally handicapped person, to translate it to Japanese and to convert the translated Japanese to a character train.

(2) A function to convert the translated Japanese character train into synthesized voices.

(3) A function to display the translated Japanese character train on the TV set 104 for confirming whether the sign language performed by an aurally handicapped person is correctly translated or not, or to translate the translated Japanese character train to the sign language and to display it as an sign language animation on the TV set 104.

The sign language telephone control device 110 comprises functions as shown in the following as the functions to translate Japanese to the sign language (Japanese to the sign language translation subsystem) among the basic sign language telephone functions.

(1) A function to recognize the voice spoken by a normal person and convert it to a Japanese character train.

(2) A function to translate the converted character train to the sign language and display it on the TV set 104 as a sign language animation.

(3) A function to compose the recognized Japanese character train with the image inputted from the camera 102 and transmit it to the videophone device on the side of a normal person for the confirmation whether the voice spoken by him or her is correctly recognized or not.

The sign language telephone control device 110 comprises functions as shown in the following besides those described in the above.

(1) A function to set a mode in which hand gestures are not recognized as the sign language. When a person wants to drink coffee while talking on the videophone device, the function prevents the hand gestures to be recognized as the sign language. The function can be also used when aurally handicapped persons consult to each other about a matter which they do not want to be known by a person at the end of the line.

(2) A function which makes it possible to display the data of hand gestures as they are and display as the animation in place of the actual image on the side of an aurally handicapped person. The function can be used when a person to talk with is an aurally handicapped person and when it is desirable not to show the actual image to him or her.

(3) A function which allows the following operation: the result of translation from the sign language to Japanese or from Japanese to the sign language being synchronized with the actual image is outputted to the videophone device on the side of a normal person or the TV set on the side of an aurally handicapped person. It takes time to translate from the sign language to Japanese or from Japanese to the sign language, and if the actual image is transferred without time delay, the actual image and the translation result become deviated from each other in point of time, which makes it difficult to understand the contents of what is talked by a person at the other end of the line. The function is able to prevent the difficulty in understanding.

(4) A function which makes it possible to display the sign language as an animation in place of an actual image besides the display of voices or characters when a response message of an answer phone is generated.

(5) A function which makes it possible to display characters, which are a result of recognition of the voice of a normal person, together with a character train which is obtained in translating the result of recognition of the sign language into Japanese on a videophone device on the side of a normal person.

FIG. 2 shows a block diagram of the hardware system of the sign language telephone control device 110. The control of the sign language telephone control device 110 is executed by a CPU 210. The program or data are stored in a magnetic disc including a program memory area or mode data memory area, and when control is executed they are loaded to a memory 222. The operation of the sign-language-to-Japanese-translation-subsystem which translates the sign language to Japanese and the Japanese to the sign language translation subsystem which translates Japanese to the sign language are executed under the control of the CPU 210 while the program memory area in the magnetic disc 202 is loaded in the memory 222. (About the software configuration of the sign-language-to-Japanese-translation-subsystem and Japanese to the sign language translation subsystem will be explained referring to FIG. 3 and FIG. 4.)

The exchange of image data or voice data are performed through the videophone connection unit 216 between the sign language telephone control device 110 and the videophone control device 118. Hand gestures are inputted from the glove-based input 114 through a hand gesture input unit 218. Actual images from the camera are inputted from the video image input unit 212. From the image output unit 204 image data are outputted to the TV set 104. Voices are taken in from the microphone 122 using the voice input unit 206. Voices are outputted from an voice output unit 214 through the speaker 126. Hand gestures or actual images are held in a memory 222 for a predetermined period of time for the processes of recognition, etc. Pictures, etc. to be output to the television are displayed using the data stored once in a memory. The setting of modes such as a translation mode or non-translation mode is partly performed through a mode data setting unit 220. The setting of a mode using the mode data setting unit 220 is performed using the mode switch 130 fixed on the sign language telephone device.

Next, the software configuration of the sign-language-to-Japanese-translation-subsystem which translates the sign language expressed by an aurally handicapped person into Japanese will be explained.

The sign language hand gestures are inputted from the glove-based input 114 (for example Data Glove, the trade mark of VPL Research, Inc.: a device for inputting the shape of hands or their positions) through the hand gesture input unit 218. The expressions on the face or the like are inputted from the camera 102 through the video image input unit 212 shown in FIG. 2. The hand gestures in the sign language inputted from the hand gesture input unit 218 are recognized in a hand gesture recognition unit 310. The position of the face or the expressions on the face are recognized in an image recognition unit 312. The recognition result performed in the hand gesture recognition unit 310 and that in the image recognition unit 312 are integrated and recognized as the sign language in the sign language integrated recognition unit 320. About the recognition methods, description is given in Japanese Patent Laid-open Application No. Hei 6-253457 (Sign Language Recognition Device) or in the paper (Hirohiko Sagawa, Hiroshi Sako, Masahiro Abe: Sign Language Interpretation System Using Continuous DP Matching, Human Interface Research Society, Information Processing Society of Japan, 44-12, 1992).

The recognized sign language is controlled whether it is to be translated to Japanese in the sign-language-to-Japanese-translation unit 324 or not. Whether it is to be translated or not is decided according to the mode, that is, the translation mode or non-translation mode. The translation mode is a mode in which sign language is to be translated to Japanese, and the non-translation mode is a mode in which sign language is not to be translated to Japanese. The changeover of modes between the translation mode and the non-translation mode can be performed with a manual operation for mode changeover, an automatic changeover to the non-translation mode when a hand is positioned at the home position (on the knee), or the mode setting with a switch equipped in the mode data setting unit 220 shown in FIG. 2, etc. The translation mode data used in the sign-language-to-Japanese-translation-control unit 324 are stored in a translation mode data memory unit 380. In the translation mode, the sign language recognized in the sign language recognition unit 320 is transferred to a sign-language-to-Japanese-translation-unit 334. About the sign-language-to-Japanese-translation-method, it is made to be known to the public by the paper (Masahiro Abe, Hiroshi Sako, Hirohiko Sagawa: Sign Language to Sentence Conversion Method Based on Sentence Structure Meaning Analysis, the Institute of Electronics and Information Communication Engineers of Japan, Vol. J76-D-11, No.9, pp. 2023–2030, 1993). When translation in the sign-language-to-Japanese-translation-unit 334 is found to be impossible, a translation-impossible-indication generation unit 338 displays that the translation was impossible on the TV set 104, a display of a sign language telephone device. For the confirmation if the sign language is correctly translated, a sign language animation generation unit 344 generates an animation for displaying the recognized sign language on the sign language telephone device. A sign language animation method is made to be known to the public by the paper (Tomoko Sakiyama, Eiji Ohira, Hirohiko Sagawa, Masahiro Abe, Kiyoshi Arai: Study on Sign Language Generation Method by Animation, No. 46 All Japan Meeting of the Information Processing Society of Japan, 8P-4, 1993). The Japanese translated in the sign-language-to-Japanese-translation-unit 334 is converted to the voice in Japanese in a voice synthesizing unit 350. The voice in Japanese or Japanese which is a result of translation in the sign-language-to-Japanese-translation-unit, is sent to an image, voice and character synchronizing unit 356 in order to generate images to transmit to the videophone device on the side of a normal person.

About the image to be sent to the videophone device on the side of a normal person, there are 2 cases: one is the case where an actual image (an image containing the face, etc. of an aurally handicapped person obtained from a camera) is used, and the other one is the case where an animation, not an actual image, is used. In the case where the actual image is used, an image obtained from a camera through the video input unit 212 is used. On the other hand, in the case where an animation is used, the animation is generated in the gesture to sign language animation conversion unit 328 using untouched hand gesture data obtained from the glove-based input 114 through the hand gesture input unit 218 and the sign language gesture recognition unit 310. The image generation unit 332 controls whether an actual image is to be sent to the videophone device on the side of a normal person or an animation is to be sent there. The image, voice and character synchronizing unit 356 synchronizes an image generated in the image generation unit 332, a character train generated in the sign-language-to-Japanese-translation-unit 334 and a synthesized voice generated in the voice synthesizing unit 350 and generates an image to be sent to a videophone device on the side of a normal person.

The image, character train and synthesized voice generated in the image, voice and character synchronizing unit 356 are transferred to an answer phone control unit 366. If they are not in the response message register mode of an answer phone, the image, character train and synthesized voice generated in the image, voice and character synchronizing unit 356 are transferred to the videophone picture generation unit 360. In the videophone image generation unit 360, a character train obtained from the translation of the transferred images, sign language, etc. to Japanese, an output 430 which is the result of recognition of the voice from the videophone device on the side of a normal person (430: the output of a display-data-for-voice-recognition-confirmation generation unit 428 in the Japanese-to-sign-language-translation-subsystem on the side of a normal person (to be explained later)), and an error message 424 to be issued when the translation to the sign language is not possible (424: the output of the translation-impossible-indication generation unit 420 in the Japanese-to-sign-language-translation-subsystem on the side of a normal person (to be explained later)) are integrated and the image to be transmitted to a videophone device on the side of a normal person is generated. The generated image and voice are combined and the combined image and voice are transmitted from a television picture and voice transmitting unit 382 to a videophone device on the side of a normal person through the videophone connection unit 216, videophone control device 118 and the telephone line network 120.

The description in the above is the explanation of the sign-language-to-Japanese-translation-subsystem; now following to it, the function of an answer phone in the sign language telephone device will be explained. In the case of an answer phone in a sign language telephone device, some different functions from those of an ordinary telephone are needed. In the case of a sign language telephone device, there is a probability that an aurally handicapped person, besides a normal person, uses the telephone. When an aurally handicapped person called on the telephone is at home, there will be an ordinary telephone conversation between aurally handicapped persons, so that the communication between them is of course possible when the device is operated as an ordinary videophone device. If there is a telephone call from an aurally handicapped person, other than a normal person, while the called aurally handicapped person is out, a response with voice (response while nobody is in) does not work. Therefore a response message in the sign language or characters, other than voice, becomes necessary as a function of an answer phone. However, many people do not want to send an actual image when a response in the sign language is performed. It is because that when there is a telephone call from a stranger while one is out, it is not desirable to use an actual image of the sign language as a response message from the point of view of protection of privacy. In such a case, a response message is generated with an animation generated in the gesture to sign language animation conversion unit 328. To do this, before the response message is generated, the sign language animation mode shall be selected as a screen mode.

If it is not the mode to generate a response message for an answer phone, the answer phone control unit 366 transfers images or voices generated in the image, voice and character synchronizing unit 356 to the videophone picture generation unit 360. If it is the mode to generate a response message for an answer phone, images or voices generated in the image, voice and character synchronizing unit 356 are stored in an answer phone data memory unit 378. When there is a telephone call during the answer phone mode, the response for it will be made taking out a response message from the answer phone data memory unit 378. Further, the system comprises such configuration as to allow a normal person to generate a response message for an answer phone in inputting an output 454 from an image, voice and character synchronizing unit 442 in the Japanese-to-sign-language-translation-subsystem (to be explained later) to the answer phone control unit 366. The message inputted by a normal person is also input to the answer phone data memory unit 378, which makes it possible to read it later in translating it to the sign language using the Japanese-to-sign-language-translation-subsystem.

Next, the software configuration of the Japanese-to-sign-language-translation-subsystem which translates Japanese spoken by a normal person to the sign language will be explained referring to FIG. 4.

The voice spoken by a normal person and the image are transmitted from the videophone device to the sign language telephone device on the side of an aurally handicapped person through the telephone line 120. The voice is received by a videophone voice data receiving unit 406, the voice which is sent from the videophone connection unit 216 shown in FIG. 2 by way of the videophone control device 118. The image is received by a videophone image data receiving unit 402, the image which is sent from the videophone connection unit 216 shown in FIG. 2 by way of the videophone control device 118. The voice received by the videophone voice data receiving unit 406 is investigated by an input changeover unit 458 if it is in a mode to generate a response message for an answer phone, and if it is not to generate a response message for an answer phone, it is converted to a Japanese character train in the voice recognition unit 412. The recognized Japanese is translated to the sign language in the Japanese-to-sign-language-translation-unit 416. The Japanese-to-sign-language-translation-method is made to be known to the public by the paper: (Eiji Ohira, Tomoko Sakiyama, Masahiro Abe, Hirohiko Sagawa: Basic Study of Sign Language Generation System, No. 46 All Japan Meeting of the Information Processing Society of Japan, 8p-3, 1993). In that case, if translation is impossible, a message telling that translation was impossible is generated in the translation-impossible-indication generation unit 420. In order to confirm if the voice recognition is correctly performed, the recognized Japanese is displayed as a character train in the display-data-for-voice-recognition confirmation generation unit 428. If it is a mode in which a normal person generates a response message, voice is not inputted from the videophone voice data receiving unit 406, but it is inputted from the voice input unit 206 shown in FIG. 2 by way of the microphone 122. The input changeover in the input changeover unit 458 is performed by the output 386 from the answer phone control unit 366 in the above-mentioned sign-language-to-Japanese-translation-subsystem.

The translated sign language is converted into an animation in the sign language to animation generation unit 438. The sign language animation generated in the sign language animation generation unit 438, the image from the videophone image data receiving unit 402 transmitted from a normal person, the characters transmitted from the Japanese to the sign language translation unit 416, and the voice from the videophone voice data receiving unit 406 sent from a normal person are synchronized in the image, voice and character synchronizing unit 442. The image, character and voice synchronized in the image, voice and character synchronizing unit 442 are sent to the videophone picture generation unit 446. The image, character and voice sent from the image, voice and character synchronizing unit 442, the character train 336 translated to Japanese from the sign-language-to-Japanese-translation-unit 334 in the above-mentioned sign-language-to-Japanese-translation-subsystem, an output 346 from the sign language animation generation unit 344, and the error message 340 from the translation impossible-indication generation unit 338 are combined to generate a videophone image in the videophone image generation unit 446, and it is sent to the TV set 104 from the television picture and voice transmitting unit 450 through the image output unit 204 shown in FIG. 2 and displayed on a screen of the TV set 104, or it is sent to the speaker 126 through the voice output unit 214 shown in FIG. 2 and output as voice.

Figure 5:
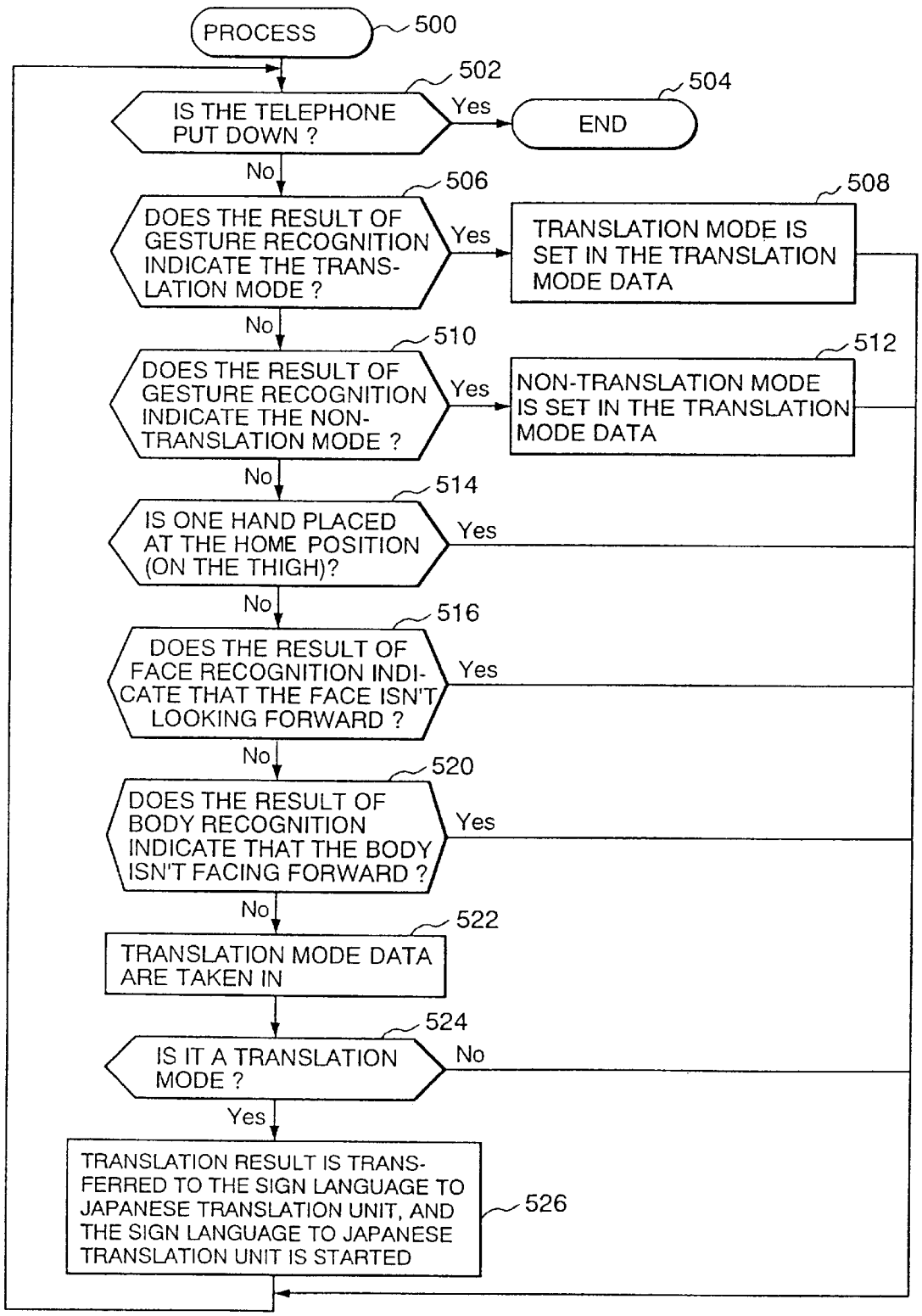
FIG. 5 shows the process flowchart of the sign-language-to-Japanese-translation-control unit.

The process of the sign-language-to-Japanese-translation-control unit 324 in the sign-language-to-Japanese-translation-subsystem explained in FIG. 3 will be explained referring to FIG. 5. The sign-language-to-Japanese-translation-control unit 324 controls the selection of the mode, either the translation mode or the non-translation mode. In the case of voice, if one does not speak, it is not conveyed to a person at the other end of the line, but in the case of the sign language, if a hand is moved, it can be regarded as an expression of the sign language. Therefore, the sign-language-to-Japanese-translation-control unit 324 prevents the move of a hand such as scratching the head or stretching a hand for drinking coffee to be recognized as an expression of the sign language by changing over a mode.

There are several ways to change over a mode in the sign-language-to-Japanese-translation-control unit 324. A hand move for the translation mode and another hand move for the non-translation mode are registered beforehand to the sign language integrated recognition unit 320 as the special sign language. It is detected whether the telephone is cut or not(502), and if the telephone is cut, process is terminated. When the telephone is not cut and if the gesture of the translation mode is recognized (506), the translation mode is set (508). If the gesture of non-translation mode is recognized (510), non-translation mode is set (512). When the position of a hand is recognized to be at the home position (514), the sign language or a hand move performed by another hand is not translated to Japanese. When the face is not looking forward (516), or when the body is not facing forward (520), the recognition results at that time are not translated to Japanese. In the case of the other sign language, translation mode data are taken in (522), and it is investigated if they are in the translation mode (524), and if it is so, the recognition result is transferred to the sign-language-to-Japanese-translation-unit 334 and it is translated to Japanese (526). If it is not, the data are abandoned.

Figure 6:
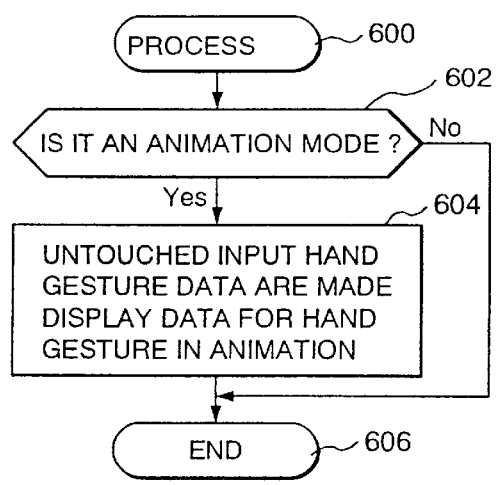
FIG. 6 shows the process flowchart of the gesture to sign language animation conversion unit.

The process of the gesture to sign language animation conversion unit 328 in the sign-language-to-Japanese-translation-subsystem explained in FIG. 3 will be explained referring to FIG. 6. If it is not the animation mode (602), nothing will be done. An image to be sent to the side of a normal person will be an actual image. If it is the animation mode (602), the hand position data inputted from the hand gesture input device unit are made the data for animation hand gestures (604). When a glove-based input is used, the data concerning the position or direction of hands or the inclination of fingers are inputted every 1/30 sec. Using these data, an animation is generated by displaying an image for animation every 1/30 sec. This method is the same as the method used in generating an animation in the sign language animation generation unit 344. The difference between them is that in the sign language animation generation unit 344, the data concerning the position of hands and the inclination of fingers corresponding to the sign language word code are used and in the gesture to sign language animation conversion unit 328 the live data of hand gestures are used. If the recognition of the expressions on the face is made possible by the image recognition, it is also made possible to give expressions on the face in the animation using the recognition result.

Figure 7:
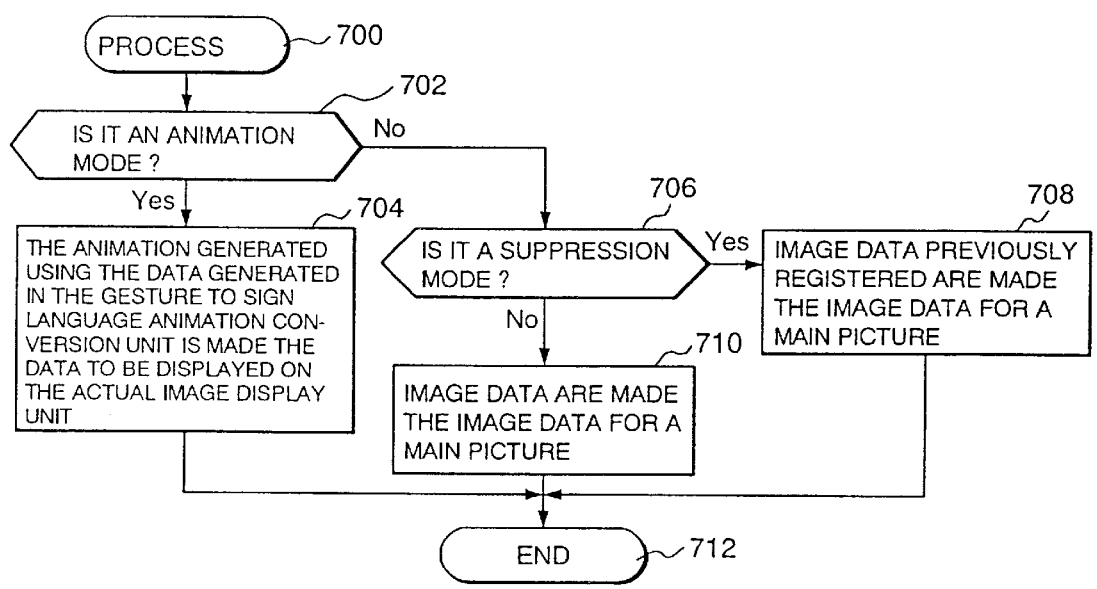
FIG. 7 shows the process flowchart of the image generation unit.

Next, the process in the image generation unit 332 in the sign-language-to-Japanese-translation-subsystem explained in FIG. 3 will be explained referring to FIG. 7. Before that, the screen of the sign language telephone device will be explained referring to FIG. 8, and the screen of the videophone device on the side of a normal person while he is talking toward the sign language telephone device will be explained referring to FIG. 9. On the screen 1600 of the sign language telephone device shown in FIG. 8, the following are displayed.

(1) Actual image display unit (1602): an actual image taken by a camera of the videophone device on the side of a normal person is displayed.

(2) Sign language animation display unit (1606): the voice of a normal person is translated to a sign language and displayed as an animation.

(3) Character display unit (1604): the voice of a normal person is recognized and displayed as characters.

(4) Sign-language-animation-for-confirmation display unit (1608): the sign language expressed by an aurally handicapped person is displayed in an animation for confirmation.

(5) Character-for-confirmation display unit (1610): the result of translation of the sign language expressed by an aurally handicapped person to Japanese is displayed by characters for confirmation.

Figure 9:
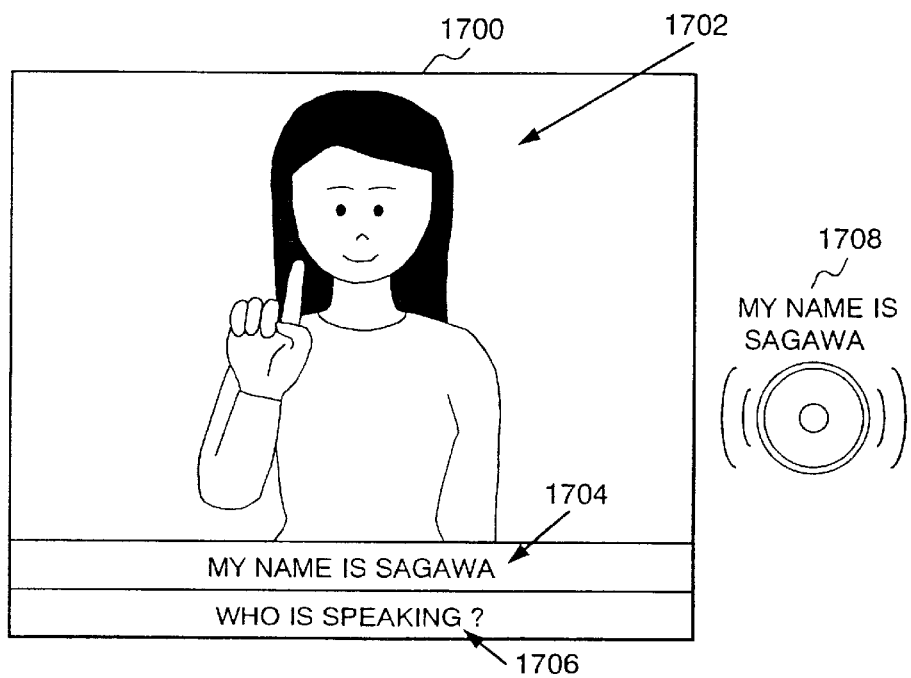
FIG. 9 shows a screen of transmission example of a videophone device.

On the other hand, following are displayed on the screen 1700 of the videophone device on the side of a normal person shown in FIG. 9.

(1) Actual image display unit (1702): an actual image taken by a camera of a sign language telephone device is displayed.

(2) Character display unit (1704): the result of translation of a sign language to Japanese is displayed in characters.

(3) Characters for confirmation display unit (1706): the result of recognition of the voice of a normal person is displayed in characters.

The characters display unit or the characters for confirmation display unit are generated on the side of a sign language telephone device. Further, it is possible to convey the result of translation of a sign language by an aurally handicapped person to Japanese with voice.

Now coming back to FIG. 7, the process in the image generation unit 332 shown in FIG. 3 will be explained. There are 3 kinds of modes in the display screen modes of the videophone device on the side of a normal person.

(1) Normal mode: an actual image is displayed.

(2) Animation mode: an animation converted in the gesture to sign language animation conversion unit is used.

(3) Suppression mode: an image which is registered before hand is displayed.

Another method in the suppression mode is to display a still picture which is registered beforehand in a sign language telephone device.

In the image generation unit 332, it is judged if it is an animation mode (702). If it is so, an animation generated using the data generated in the gesture to sign language animation conversion unit 328, is used as data to be displayed on the actual image display unit 1702 of a videophone device on the side of a normal person (704). If it is not an animation mode, it is investigated if it is a suppression mode (706). If it is a suppression mode, the image data which have been registered beforehand are used as data to be displayed in the actual image display unit 1702 in a videophone device on the side of a normal person (708). If it is not a suppression mode, it should be regarded as an ordinary mode, so that the image data will be used as data to be displayed on the actual image display unit 1702 of a videophone device on the side of a normal person (710).

Figure 10:
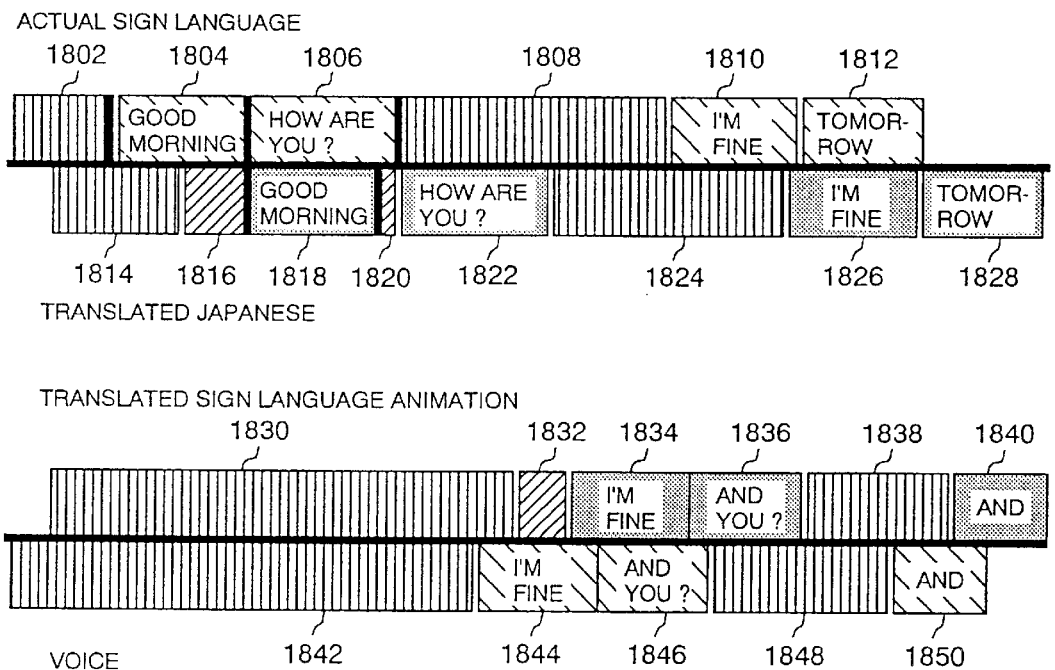
FIG. 10 shows an illustrative drawing of a synchronizing method between the sign language and translation results, or between the voice and recognition results.

Next, the process in the image, voice and character synchronizing unit 356 in the sign-language-to-Japanese-translation-subsystem, and the process in the image, voice and character synchronizing unit 442 in the Japanese-to-sign-language-translation-subsystem will be explained referring to FIG. 10. There is only a difference in translation results between these processes.

It takes time to translate the result of the sign language recognition to Japanese and display as voice because of the reasons that before one word of the sign language is completed, the translation of it to Japanese is impossible, etc. Therefore, in order to synchronize the actual image of an aurally handicapped person performing the sign language and the voice obtained by translating the sign language to Japanese and transmit them to a videophone on the side of a normal person, it is necessary to delay the transmission of the actual image for the period of time needed for the process in which the result of the sign language recognition is translated to Japanese and converted to voice. In order to synchronize the actual image and the result of recognition, the time when the actual image, sign language or the voice is inputted is recorded beforehand. The basic idea of synchronization is that the actual image is temporarily stored and when the sign language translated to Japanese or the voice translated to the sign language animation is outputted, the actual image is displayed so that it coincide with the time given to the original sign language or voice.

A method for synchronizing a translation result and an actual image will be explained referring to FIG. 10. In the figure, from 1802 to 1812 is the period of time in which the sign language is performed by an aurally handicapped person, from 1814 to 1828 is the period of time in which the actual image and the synthesized voice of translated Japanese are being transferred to the videophone device on the side of a normal person being synchronized, from 1842 to 1850 is the period of time in which the normal person is speaking Japanese, from 1830 to 1840 is the period of time in which voice recognition is performed in the sign language telephone device, and the sign language animation obtained in translating the recognized characters to the sign language and the screen of the videophone on the side of the normal person are displayed being synchronized. A case where a telephone call is performed from the sign language telephone device to an ordinary videophone will be considered. The time 1802 is the time when the sign language telephone device is connected to the videophone on the side of the normal person and the face of a person on the other end of the line is being confirmed. And then the aurally handicapped person talks to the normal person in the sign language "Good morning!" "How are you?" The periods of time, 1804 and 1806 are the talking time. In the sign language telephone device, for the time of 1804, when the aurally handicapped person expresses "Good morning!" in the sign language, translation of it is performed. After saying "Good morning!" in the sign language, the sign language is translated to Japanese voice, and for the time of 1818, "Good morning!" is expressed in voice and displayed by characters together with the actual image for the time of 1804 in the videophone on the side of a normal person. When "How are you?" is expressed for the time of 1806 in the sign language, for the time of 1822, "How are you?' is expressed with voice and displayed with characters together with the actual image for the time of 1806. The normal person, looking at the sign language at the time of 1818 and 1822, answers "I'm fine thank you" for the time of 1844 on the videophone on the side of the normal person. In the image and voice transmitted to the sign language telephone device for the time of 1844, the voice is translated to the sign language animation. And the sign language animation expressing "I'm fine thank you." and the actual image for the time of 1844 are displayed on the sign language telephone device.

However, in the case where the sign language performed for the time of 1804 is displayed for the time of 1818, even though the actual image for the time of 1802 is transmitted to the person at the other end of the line for the time of 1814 in delaying a little, for the time of 1816, it is impossible to recognize the sign language word until the sign language word is completed, so that there is no image to display for the time of 1816. The length of display of a sequence of words differs from that of a word, so that there is no actual image to display for the time of 1820. The time of completion of translation of the voice "And you?" input for the time of 1846 to the sign language will become the time of 1836, and there is a case where the period of time becomes longer in comparison with the time of 1844 as in the case of the sign language animation. In that case, it is necessary to compress the actual image for the time of 1848 to the time of 1838. As mentioned in the above, when an actual image and the translation result is synchronized, there can be the case where there is no actual image to display or there is not enough time to display all.

In the case of a sign language telephone device, when there is no actual image to display, the last still picture is used as a supplement. As the actual image for the time of 1816, the last still picture for the time of 1814 is displayed. The same thing can be applied to the time of 1820.

In the case where all images were not possible to display, in a sign language telephone device, surplus images are simply abandoned or they are displayed in a quick operation. The time of 1838 is short in comparison with the time of 1848, so that in order to shorten the time of 1848, the end part is cut and the next sign language animation is displayed. The fact that the time of 1838 is shorter than the time of 1848 is caused by the fact that the time of 1836 is long in comparison with the time of 1846. During the time of 1838, at the time when an actual image is started to be displayed, it can be found that how much the time of 1836 is longer than the time of 1846, so that it can be estimated how much the time of 1836 has to be shortened in comparison with the time of 1846. According to the estimation, to make the actual image for the time of 1848 be finished within the time of 1838, the actual image is displayed in the quick operation mode.

Figure 11:
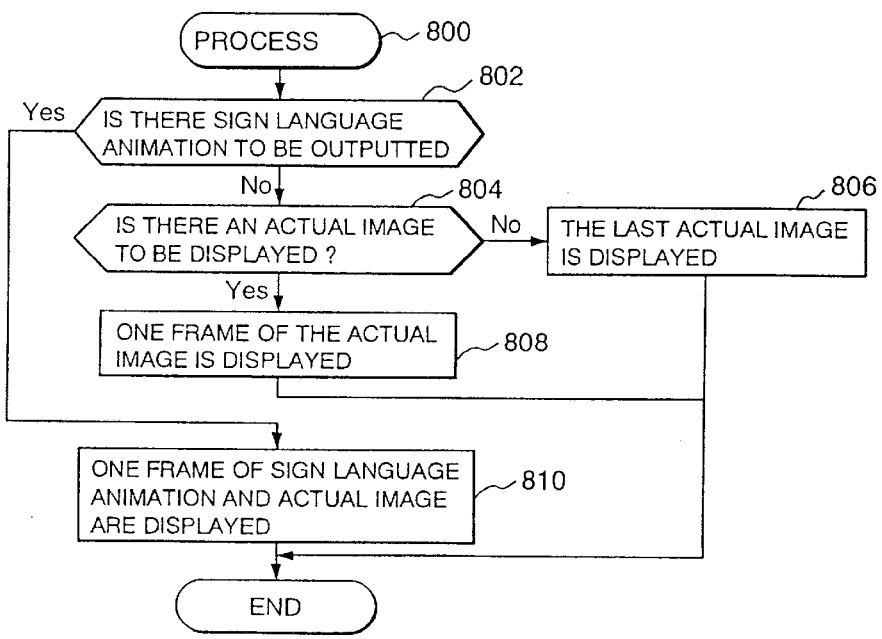
FIG. 11 shows the process flowchart of the image, voice and character synchronizing unit of the Japanese-to-sign-language-translation-subsystem.

One of the embodiments in which the sign language animation which is a result of translation, and the actual image and voice are displayed being synchronized by the image, voice and character synchronizing unit is shown in FIG. 11. That is an embodiment of the process in the image, voice and character synchronizing unit in the Japanese-to-sign-language-translation-subsystem. At first, it is investigated if there is a sign language animation to be output (802). If there is, the sign language animation and the image of one frame are displayed (810), and next, it is investigated if there is a sign language animation to be output. Every time when one frame is displayed, the number of frames of the sign language animation to be displayed is decreased. When all sign language animations are displayed, it becomes impossible to display the sign language animation. If there is no sign language animation to be displayed, it is investigated if there is an actual image to be displayed (804). If there is an image to be displayed, one frame of the actual image is displayed (808). If there is not, the last image is displayed (806). When one frame is displayed, coming back to the first, it is investigated again if there is a sign language animation to be displayed. The voice accompanied to an actual image corresponding to one frame of the actual image is outputted every time when the actual image is displayed 1 frame by 1 frame.

Figure 12:
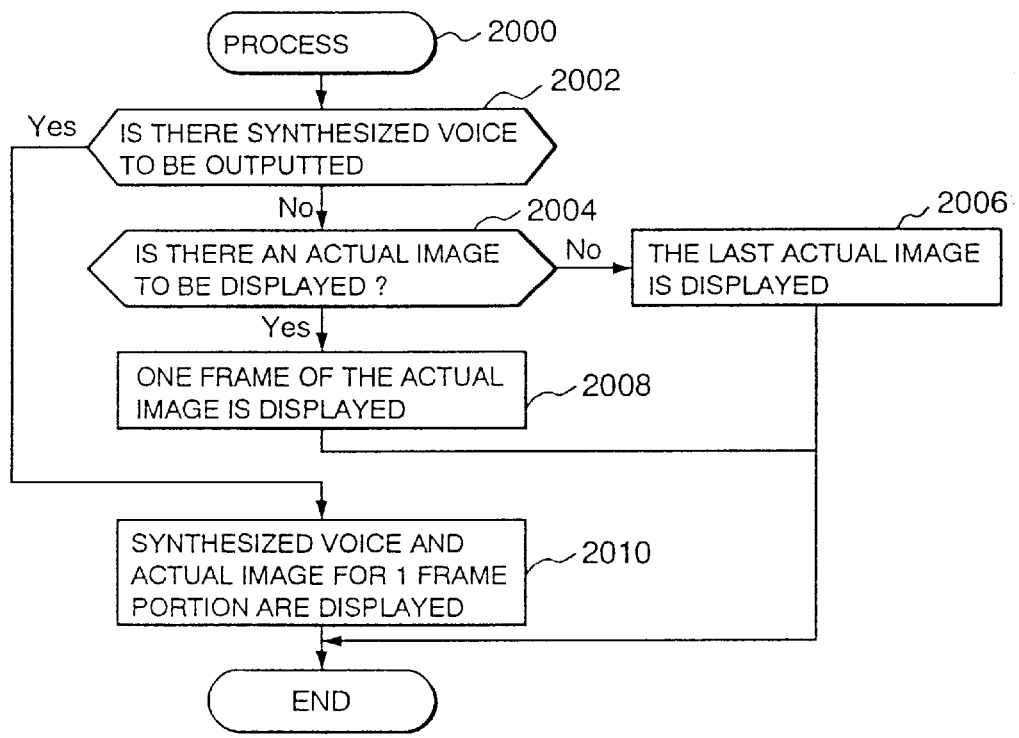
FIG. 12 shows the process flowchart of the image, voice and character synchronizing unit in the sign-language-to-Japanese-translation-subsystem.

About the embodiment of the process in the image, voice and character synchronizing unit 356 in the sign-language-to-Japanese-translation-subsystem will be explained referring to FIG. 12. The voice translated from the sign language and synthesized in the voice synthesizing unit is managed by the frame which is the display unit of the actual image. It is investigated if there is a synthesized voice to be output (2002). If there is not, it is investigated if there is an actual image to be displayed (2004). If there is an actual image to be displayed, one frame of the actual image is displayed (2008). If there is not, the last image is displayed (2006). If there is a synthesized voice to be output, the synthesized voice and the actual image for one frame are outputted (2010) and the process is returned to the first. It is investigated again if there is a synthesized voice to be output. The voice accompanied to the actual image is outputted by one frame of the actual image every time when the actual image is displayed frame by frame.

Figure 8:
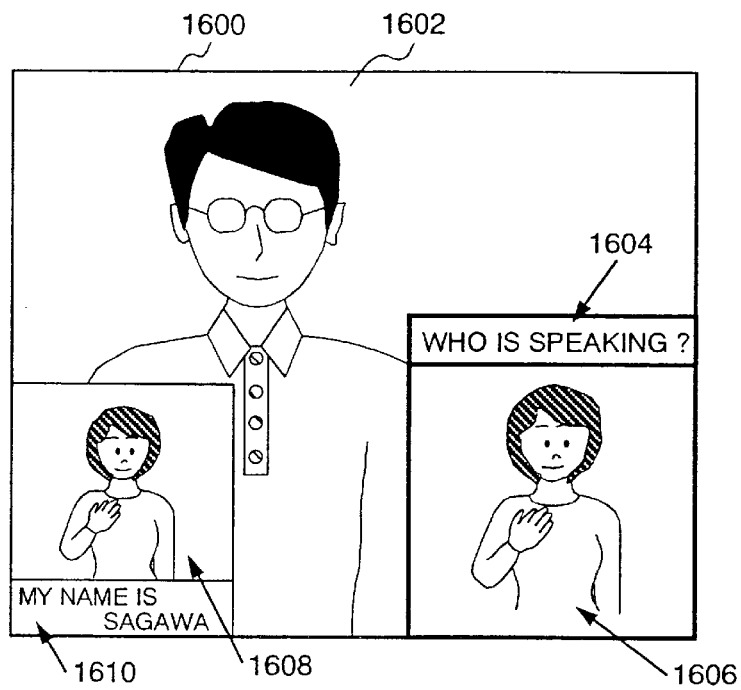
FIG. 8 shows a screen example of the sign language standard mode of a sign language telephone device.
Figure 13:
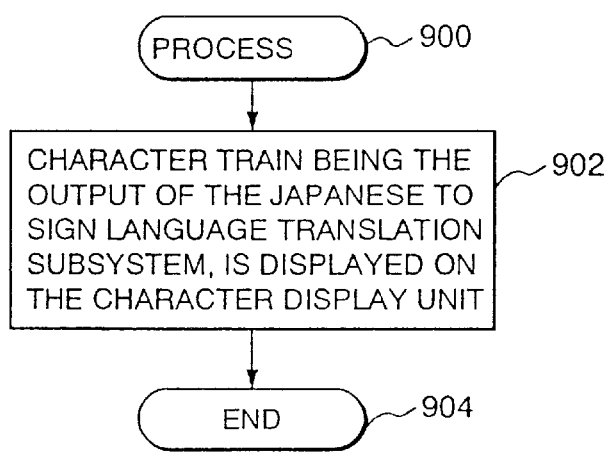
FIG. 13 shows the process flowchart of display of the voice recognition unit.

The result in the voice recognition unit 412, as shown in FIG. 13, is also displayed as Japanese characters (902) besides the sign language animation. These are displayed on the character display unit 1604 on the side of the sign language telephone device as shown in FIG. 8.

Next, the process of the function of an answer phone in the sign language telephone device will be explained. There is a probability that the sign language telephone device can be called by a normal person and also an aurally handicapped person, so that in order to correspond to both cases, it is necessary that the response message of an answer phone is able to response in the sign language or characters other than voice. There is a probability a normal person besides an aurally handicapped person may register to the response message of a sign language telephone device.

There is a probability that it is called by various kinds of people, so that some may not want to display an actual image. There are 3 modes in the response message as in the case of conversation.

(1) Ordinary mode: an actual image is displayed.

(2) Animation mode: an animation converted in the gesture to sign language animation conversion unit is used.

(3) Suppression mode: an image is not displayed on the main screen or an image registered beforehand is displayed.

Further when a normal person registers a response message to the sign language telephone device, a sign language mode shall be added to the modes for aurally handicapped person described from (1) to (3) in the above.

(4) Sign language mode: the translated sign language is displayed as an animation on the main screen.

Before registration is started, an answer phone registration mode is selected out of the above 4 modes by the mode switch 130.

Figure 14:
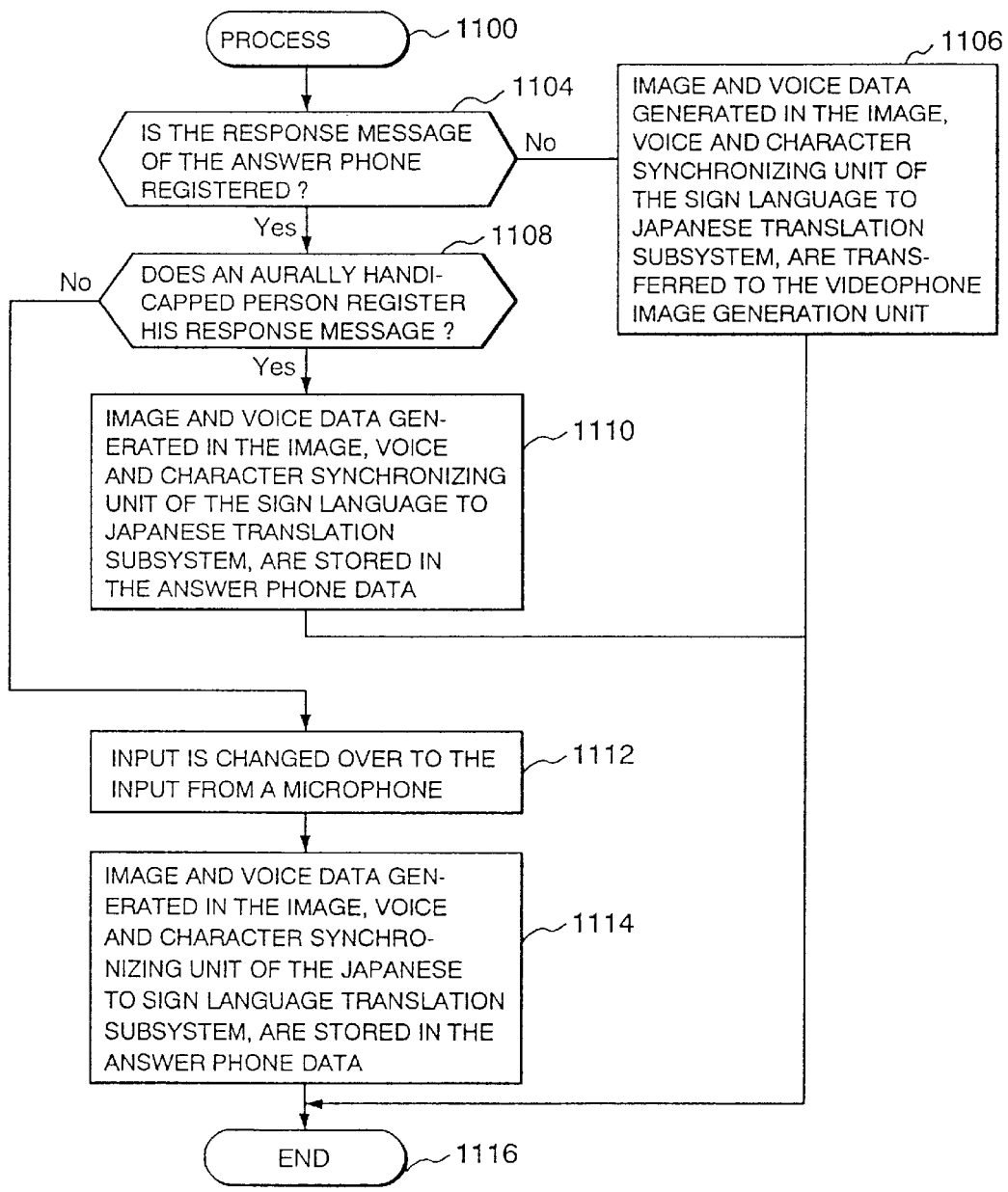
FIG. 14 shows the process flowchart of an answer phone control unit.
Figure 21:
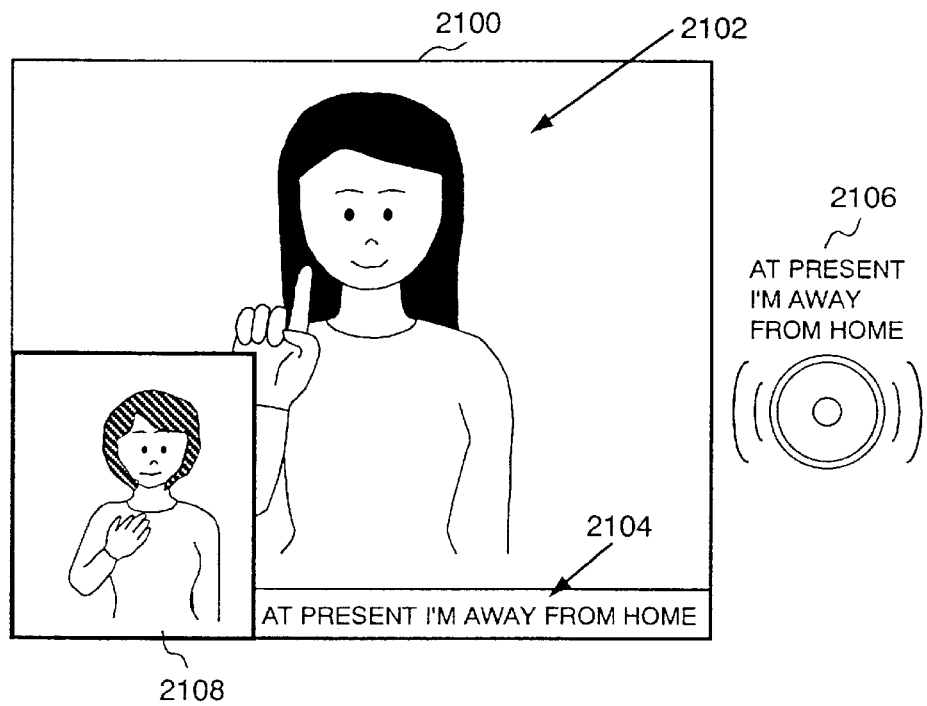
FIG. 21 shows a display screen of a response message in an ordinary mode of a videophone device.
Figure 22:
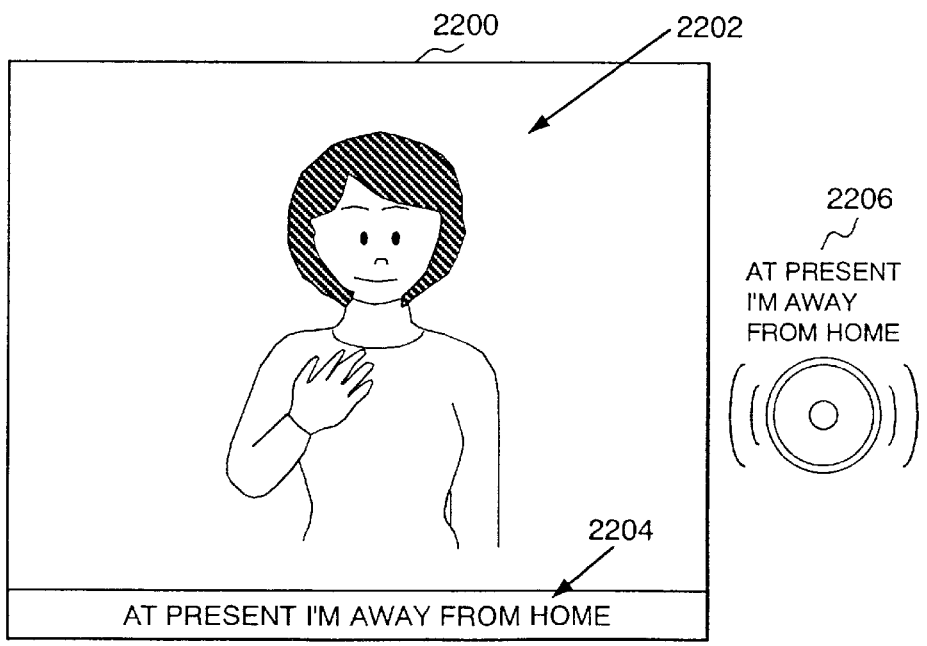
FIG. 22 shows a display screen of a response message in a sign language mode of a videophone device.

About the detail concerning the process in an answer phone control unit 366 in the sign-language-to-Japanese-translation-subsystem explanation will be given referring to FIG. 14. The screen of a response message in the ordinary mode is shown in FIG. 21. This picture is displayed in the videophone on the call originating side. An actual image is displayed in 2102, a sign language animation in a response message is shown in 2108, and a text is shown in 2104. At the same time, voice is outputted. The screen of a response message in the sign language mode is shown in FIG. 22. The screen is displayed in the videophone on the call originating side. In the sign language mode, an actual image is not displayed, and an animation is displayed in 2202. At first, it is investigated whether it is the mode in which a response message of an answer phone is registered (1104). If it is not a registration mode, images or voice data generated in the image, voice and character synchronizing unit 356 in the sign-language-to-Japanese-translation-subsystem are transferred to the videophone picture generation unit 360 (1106). If it is a registration mode, it is investigated if the response message is to be registered in the sign language (1108). If it is the registration in the sign language, image or voice data generated in the image, voice and character synchronizing unit in the sign-language-to-Japanese-translation-subsystem are stored in the answer phone data memory unit 378 (1110). When a registration message is generated, the display in the mode, described from (1) to (3), is made possible by selecting a screen mode to be displayed on a videophone on the side of a normal person. If it is the registration in voice, the input from the input changeover unit 458 is changed over from the voice data obtained from the videophone voice data receiving unit 406 to the voice data obtained from the voice input unit 206 through a microphone (1112). The image or voice data generated in the image, voice and character synchronizing unit 454 in the Japanese-to-sign-language-translation-subsystem are stored in the answer phone data memory unit 378 (1114). In the case of the sign language mode, the sign language which is translated to the sign language in the sign language animation generation unit 438 is displayed as an animation on the actual image display unit 1702 in place of the actual image.

Figure 15:
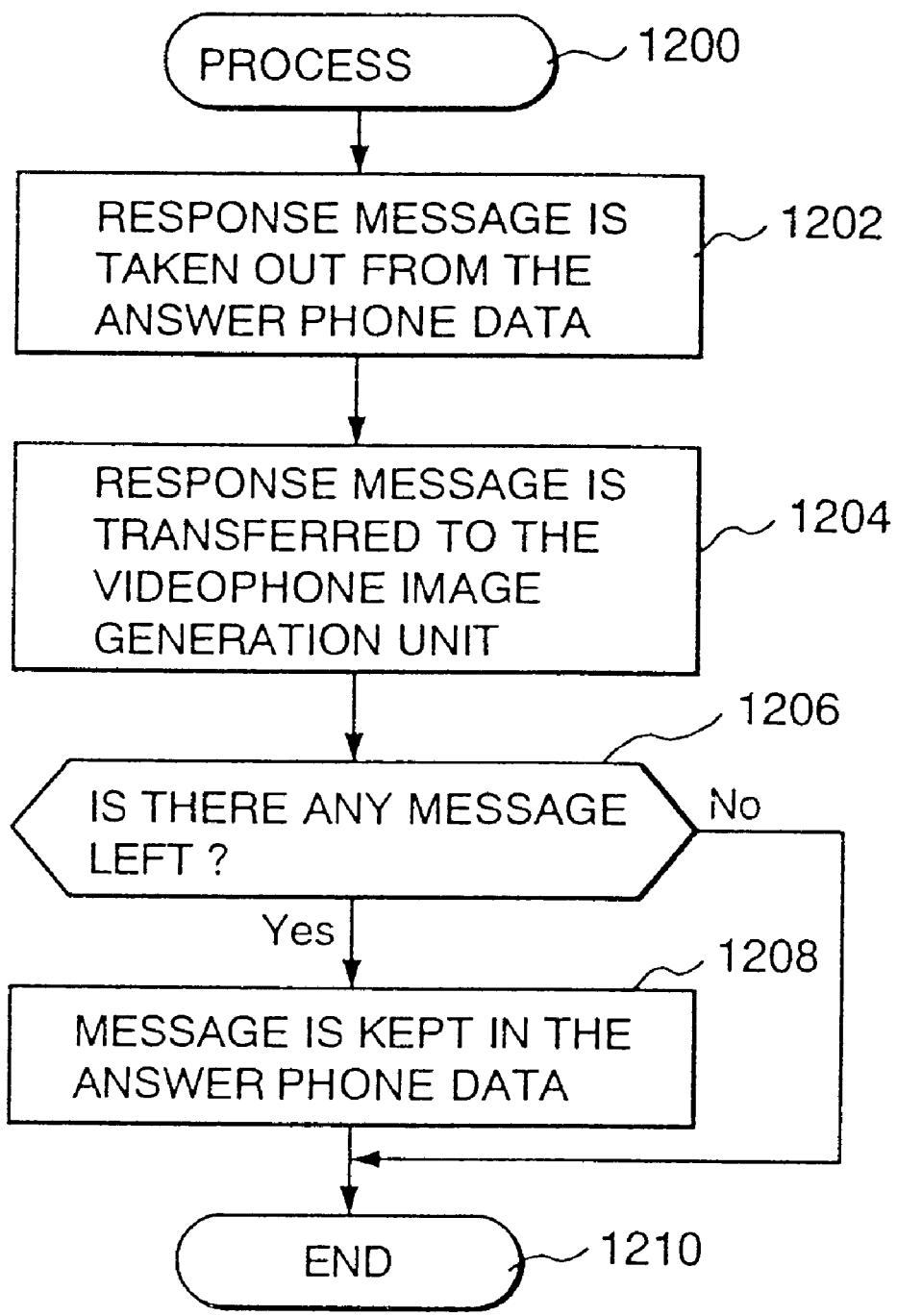
FIG. 15 shows the response process flowchart of a response massage of an answer phone.

The process of an answer phone control unit when there is a phone call to the telephone device in the answer phone mode will be explained referring to FIG. 15. When there is a phone call in the answer phone mode, a response message is taken out from the answer phone data memory unit 378 (1202), and the message is transferred to the video phone picture generation unit 360 (1204). If there is a message from the call originating side, the message is stored in the answer phone (1208). In a case of regeneration, when an aurally handicapped person is on the receiving side and a normal person is on the transmitting side, it is possible to read the message in translating it to the sign language in the Japanese to the sign language translation subsystem. When a normal person is on the receiving side and an aurally handicapped person is on the transmitting side, it is possible to read the message in translating it to Japanese in the sign-language-to-Japanese-translation-subsystem.

Next, the explanation will be given about the received picture display mode on the screen in the sign language telephone device. The setting of the received picture display mode is performed with the mode switch 130. There are the sign language standard mode, sign language enlargement mode, sign language animation mode and non-sign-language mode in the received picture display modes.

The sign language standard mode is used to display the actual image display unit 1602 or sign language animation display unit 1606 in the allotment decided in the sign language telephone device as shown in FIG. 8.

Figure 16:
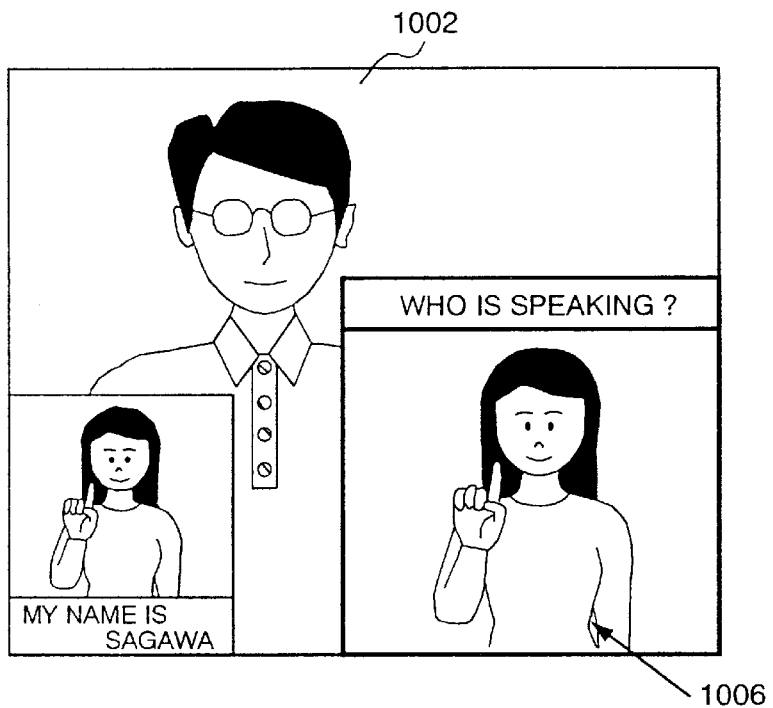
FIG. 16 shows a screen example in the sign language enlargement mode of a sign language telephone device.

In the sign language enlargement mode, as shown in FIG. 16, the sign language animation display unit 1606 in the sign language standard mode shown in FIG. 8 is displayed in a larger pattern than that in the actual image display unit 1602, and they are respectively displayed as a sign language animation display unit 1006 and actual image display unit 1002.

Figure 17:
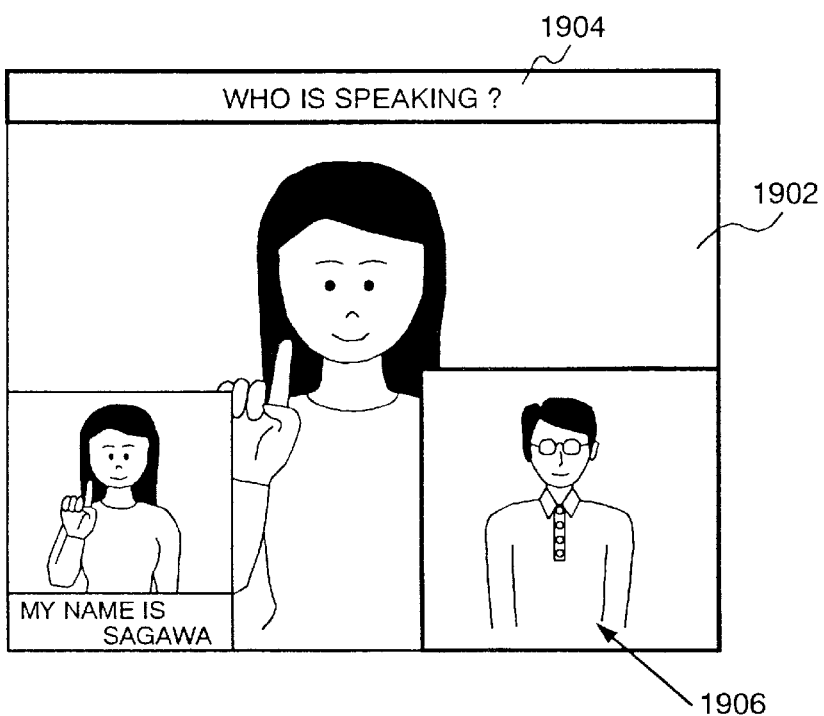
FIG. 17 shows a screen example in the sign language animation mode of a sign language telephone device.

In the sign language animation mode, as shown in FIG. 17, the actual display unit 1602 and the sign language animation display unit 1606 in the sign language standard mode shown in FIG. 8 are interchanged, and they are respectively displayed as an actual image display unit 1906 and a sign language animation display unit 1902. The character display unit 1904 is also displayed being enlarged concomitant with the sign language animation display unit 1902.

Both sign language enlargement mode and sign language animation mode make the sign language animation easily be watched in displaying it in a larger pattern. The non-sign-language mode is the mode in which the sign language is not used, and the device is the same as an ordinary videophone.

Figure 18:
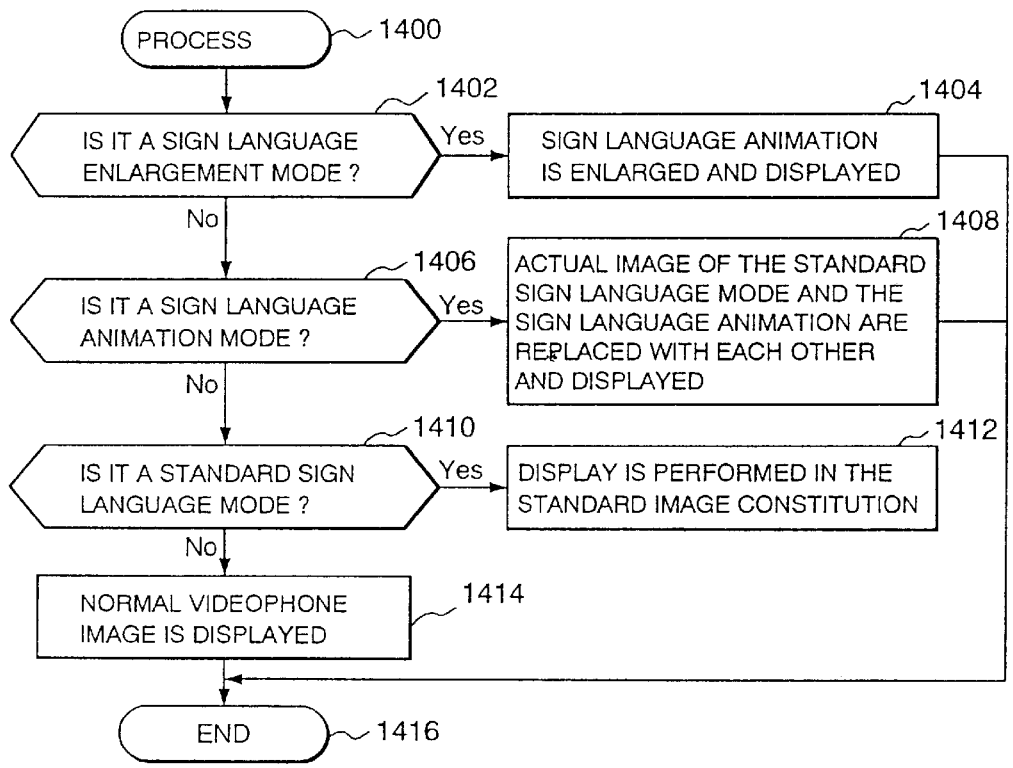
FIG. 18 shows the screen display flowchart of a sign language telephone device.

The display method of a received picture in the sign language telephone device will be explained referring to FIG. 18. It is investigated if the mode is the sign language enlargement mode (1402). If it is so, the sign language animation display unit is displayed being enlarged as shown in FIG. 16 (1404). If it is not, it is investigated if the mode is the sign language animation mode (1406). If it is so, the actual image display unit and sign language animation display unit in the sign language standard mode are interchanged with each other, and displayed as shown in FIG. 17 (1408). In the sign language standard mode, the sign language animation is displayed in the form of the standard configuration as shown in FIG. 8 (1412). In the case of the non-sign-language mode, translation is not performed, and pictures are displayed as an ordinary videophone (1414).

Figure 19:
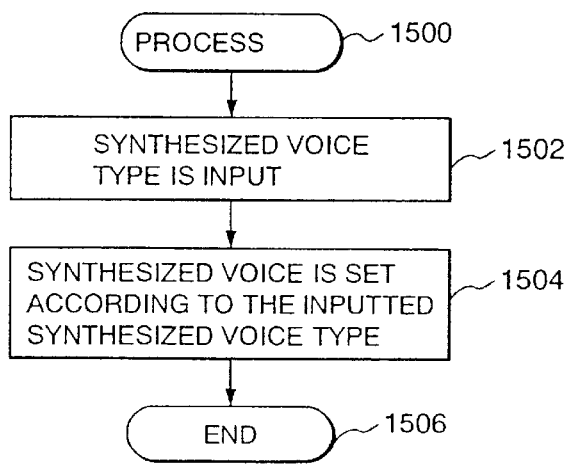
FIG. 19 shows the setting process flowchart of a synthesized voice.

Next, the setting process of the voice in the voice synthesis will be explained referring to FIG. 19. At first, a desirable type of synthesized voice is selected (1502). It is set so that a synthesized voice is outputted according to the selection in the above (1504). This is because the uneasy feeling of listeners of the synthesized voice will be decreased if it is arranged to be able to select the quality of a synthesized voice, for example, the synthesized voice can be made a male voice or female voice according to the person's sex who uses the sign language or the synthesized voice can be a high tone voice for a young person or a low tone voice for an aged person.

As a variation of the first embodiment following can be considered: it is made possible to communicate with a foreigner in translating the voice or character train of a videophone transmitted in a foreign language by providing a foreign language translation unit in the sign language telephone control device 110 of the sign language telephone device. In that case, a foreign language translation program will be provided in the magnetic disc 202 shown in FIG. 2, and it will be loaded in the memory 222, and the operation will be executed under the control of the CPU 210. Further, the execution of the following will be easy for the persons working on this line of business: translation of Japanese sign language to a foreign language and the transmission of it to a videophone device on the side of a normal foreigner or a both way communication between a foreign sign language and Japanese. The foreign language translation unit can be provided in a videophone control device other than the sign language telephone control device (either in the sign language telephone device or in the videophone device). In the case of the translation of Japanese sign language to English, Japanese to English translation unit will be incorporated in the sign-language-to-Japanese-translation-unit 334 shown in FIG. 3 and an English voice synthesizing function will be added to the voice synthesizing unit 350. In the case of the translation of English to Japanese sign language, an English voice recognizing function will be added to the voice recognition unit 412 shown in FIG. 4, and an English to Japanese translation unit which converts an English text to a Japanese text, the output of the voice recognition unit 412, will be incorporated in the Japanese-to-sign-language-translation-unit 416.

Another variation of the first embodiment, makes a simple mode possible in which an ordinary telephone device (including PHS) for voice only can be connected, not a videophone, on the side of a normal person. In other words, when a system is so constituted that a sign language animation is generated from the voice sent from the telephone and displayed in the sign language telephone control device on the side of the sign language telephone device and the response is performed with only voice, even if there remains something to be studied as a both way real time communication, a long distance communication (conversation) between an aurally handicapped person and a normal person can be realized in a simple mode.

Figure 20:
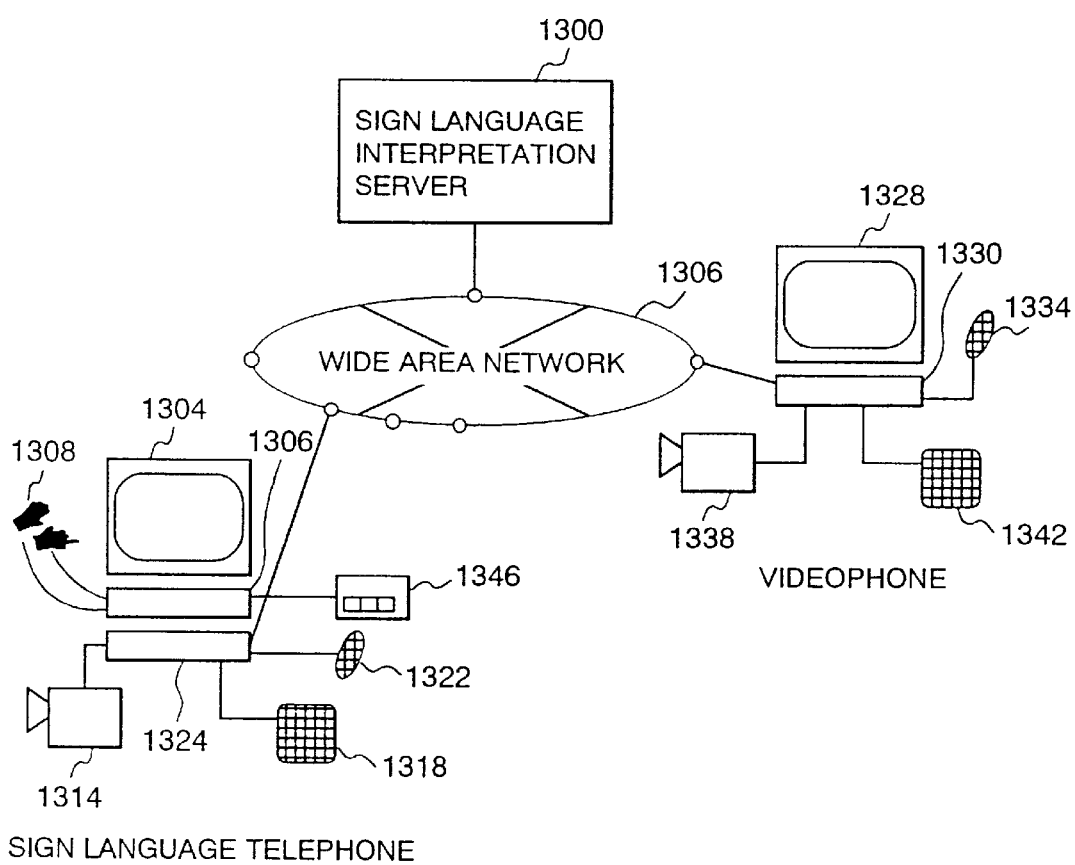
FIG. 20 shows the block diagram of a sign language telephone device provided with an interpretation server.

Next, a second embodiment will be explained. In the embodiment explained in the above, various kinds of functions were concentrated on the side of the sign language telephone device. In the second embodiment, the functions in the sign language telephone device explained in the first embodiment are subjected to centralized controls in providing a sign language interpretation server 1300 on a wide area communication network such as BISDN or ATM as shown in FIG. 20. Thereby, the sign language recognition, generation of sign language animation, voice recognition, voice synthesis, etc. which are executed in the sign language telephone control device 110 are executed in the sign language interpretation server 1300. Owing to such configuration as mentioned in the above, it is made possible to offer a system, in which sign language telephone devices for respective persons on the side of aurally handicapped persons are not needed and it is only required to connect a special input device or the like for inputting hand gestures to an external input interface of an ordinary videophone device, and the recognition of the sign language, etc. can be performed in the sign language interpretation server; thereby the system may have a possibility to be widely used in the market.

In the second embodiment, the sign language telephone device comprises a TV set 1304, camera 1314, microphone 1322, speaker 1318 and a mode switch 1346, and it is also provided with a special glove 1308 such as a Cyber Glove (the trade mark of Virtual Technologies) (of course, the use of a Data Glove is possible). The main inputs of the sign language telephone control device 1306 are the input from a glove and the input of mode data setting from the mode switch 1346. The input data are transmitted to the sign language interpretation server 1300 through the videophone control device 1324. The image data inputted from the camera 1314 are transmitted to the sign language interpretation server 1300 through the videophone control device 1324. The camera 1314, speaker 1318 and the microphone 1322 are connected to the videophone control device 1324, which is the different point from the first embodiment. It is because of the fact that the data of images or voices are directly exchanged with the sign language interpretation server through the network. (In the first embodiment, these equipment are connected to the sign language telephone control device 110.)

The sign language telephone device is connected to a wide area network 1306, and the system is so constituted that the sign language interpretation server 1300 can be accessed by the sign language telephone device. The videophone device, in the same way as in the case of the first embodiment, comprises a TV set 1328, camera 1338, microphone 1334, speaker 1342 and a videophone control device 1330. This videophone device is also connected to the wide area network 1306.

The operation of the second embodiment will be explained. Hand gesture data or image data sent from the sign language telephone control device 1324 are used for the translation from the sign language to Japanese, and in the sign language interpretation server 1300, the sign language is translated to Japanese using the data, and an image shown FIG. 9 is generated as a display picture, and together with the generated synthesized voice, it is transferred to the videophone control device 1330.

The voice sent from the videophone 1330 is recognized in the sign language interpretation server 1300 and is made Japanese characters and translated to the sign language. As a display picture, a picture as shown in FIG. 8 is generated and it is transferred to videophone control device 1324 on the side of an aurally handicapped person.

As described in the above, according to the second embodiment, the system is managed under the centralized control of the sign language interpretation server 1300; thereby, in utilizing the network environment prepared with videophone devices, communication between a plurality of sign language telephone devices and videophone devices, or between sign language telephone devices is made possible.

The technology of communications between various foreign languages and the sign language in providing a foreign language translation unit or between the voice from an ordinary telephone and the sign language is also applicable to the second embodiment.

In the first and the second embodiment, as a means to input the sign language, a special glove such as Data Glove is used; however the present invention is applicable to the case where the sign language is inputted as images without using a Data Glove and it is recognized in the image recognition unit. Besides the above-mentioned examples, various kinds of combinations of the cases written in the embodiments or their variations are possible as the occasion may demand.

According to the present invention, it is made possible to offer a simple device with which an aurally handicapped person who uses the sign language is able to converse with a normal person at a distant place who does not know the sign language. Long distance communication (conversation) in the sign language through an existing network is made possible.

Further, either the translation mode or the non-translation mode can be selected, in the non-translation mode a hand move other than the sign language while a sign language telephone device is being used is not translated; thereby the degree of freedom in using the sign language telephone device is increased. The actual image of an aurally handicapped person is not output to a videophone device on the side of a normal person and the display on the videophone can be made with an sign language animation, which makes much help to the protection of privacy. Since the sign language telephone device on the side of an aurally handicapped person and the display on the videophone device on the side of a normal person are synchronized with each other, good communication can be enjoyed.

A response message for a telephone call which is made while no body is in is generated in combining the voice, image, character or sign language animation, which is effective for protecting privacy. The characters, which is a result of voice recognition of a normal person, are displayed on a videophone device on the side of a normal person together with a character train obtained in translating the recognition result of the sign language, so that a person on the side of a normal person is able to confirm if the contents of his talk is correctly transmitted to the sign language telephone device.

INDUSTRIAL APPLICABILITY

As described in the above, the present invention, as the sign language telephone device which can be connected to a videophone or a telephone device by voice through a telephone line as a network (public network), is suitable to be used for the conversation between an aurally handicapped person who uses the sign language and a normal person at a distant place who does not know the sign language.

What is claimed is:

1. A sign language telephone system comprising:
   a videophone device; and
   a sign language telephone control device operatively connected to said videophone device via a network, which translates an input sign language, generates synthesized voices for transmission to said videophone device via said network, recognizes voices from said videophone device, and generates a sign language animation from recognized results for a visual display, said sign language telephone control device comprising:
   a sign-language-to-Japanese-translation subsystem comprising:
      a sign language recognition unit which recognizes and translates the input sign language to a sign language words train;
      a sign-language-to-Japanese-translation unit which translates the sign language words train into Japanese;
      a voice synthesizing unit which synthesizes the translated Japanese as voices; and
      a gesture-to-sign language animation conversion unit which generates animations by using positional data of hand gestures from the input sign language; and
   a Japanese-to-sign-language-translation subsystem comprising which translates voices from said videophone device into a sign language words train.

2. A sign language telephone system as claimed in claim 1, further comprising a television set, a camera, a microphone, a speaker and sign language input means for providing the input sign language.

3. A sign language telephone system as claimed in claim 2, wherein said sign language telephone control device further comprises means to enable a visual display of a Japanese character train, which is a result of translation of the input sign language as part of said images to be transmitted to said videophone device via said network.

4. A sign language telephone system as claimed in claim 2, wherein said sign language telephone control device further comprises means to enable a visual display of a Japanese character train, which is a result of translation of the input sign language and at least one animation among animations generated from said animation generation unit, in a part of the screen of said television set.

5. A sign language telephone system as claimed in claim 2, wherein said Japanese-to-sign-language-translation subsystem comprises:

a voice recognition unit which recognizes Japanese voices from said videophone device via said network;

a Japanese-to-sign-language-translation unit which translates Japanese recognized from said voice recognition unit into the sign language; and a sign language animation generation unit which displays the translated sign language as sign language animations.

6. A sign language telephone system as claimed in claim 2, wherein said sign-language-to-Japanese-translation subsystem further comprises means to select voice quality or adjustment of voice synthesis.

7. A sign language telephone system as claimed in claim 1, wherein said sign language telephone control device further comprises language translation means which allows communications between the sign language as a first language and the voices as a second language.

8. A sign language telephone system comprising:

a videophone device;

a television set;

a camera;

a microphone;

speakers;

sign language input means; and a sign language telephone control device connected to said television set, said camera, said microphone, said speakers, said sign language input means, and operatively connected to said videophone device via a network, which translates an input sign language from said sign language input means, generates synthesized voices for transmission to said videophone device via said network, recognizes voices from said videophone device, and generates a sign language animation based on recognized voices for a visual display, said sign language telephone control device comprising:

a sign-to-language-to-Japanese-translation subsystem comprising:

a sign language recognition unit which recognizes and translates the input sign language to a sign language words train;

a sign-language-to-Japanese-translation unit which translates the sign language words train into Japanese;

a voice synthesizing unit which synthesizes the translated Japanese as voices; and a sign-language-to-Japanese-translation control unit which controls operation in one of a translation mode and a non-translation mode, including enabling translation of the sign language words train from the sign language recognition unit to Japanese by the sign-language-to-Japanese-translation unit during said translation mode, and terminating translation of the sign language words train to Japanese during said non-translation mode; and a Japanese-to-sign-language-translation subsystem which translates voices from said videophone device into a sign language words train.

9. A sign language telephone system as claimed in claim 8, wherein said sign language telephone control device comprises means to decide between a translation mode a non-translation mode with a button, means to decide said translation mode when an operator is facing said camera, and said non-translation mode when a hand of said operator is at a home position, or when movement of the hand of said operator is stopped, and means in which hand gestures are set beforehand and one of said translation mode and said non-translation mode is decided by the hand gesture.

10. A sign language telephone system as claimed in claim 8, wherein said sign-language-to-Japanese-translation subsystem further comprises a gesture-to-sign-language animation conversion unit which generates animations by using positional data of hand gestures from the input sign language as data to move animations.

11. A sign language telephone system comprising:

a videophone device;

a television set;

a camera;

a microphone;

speakers;

sign language input means; and a sign language telephone control device connected to said television set, said camera, said microphone, said speakers, said sign language input means, and operatively connected to said videophone device via a network, which translates an input sign language from said sign language input means, generates synthesized voices for transmission to said videophone device via said network, recognizes voices from said videophone device, and generates a sign language animation based on recognized voices for a visual display, said sign language telephone control device comprising:

a sign-to-language-to-Japanese-translation subsystem operable in an actual image mode, an animation mode, a suppression mode, and comprising:

a sign language recognition unit which recognizes and translates the input sign language to a sign language words train;

a sign-language-to-Japanese-translation unit which translates the sign language words train into Japanese;

a voice synthesizing unit which synthesizes the translated Japanese as voices;

a gesture-to-sign-language animation conversion unit which generates sign language animations by using positional data of hand gestures from the input sign language as data to move animations; and an image generation unit which generates sign language animations, and which enables a visual display of an actual image from said camera during said actual image mode, sign language animations during said animation mode, and either a designated still image or no image during said suppression mode; and a Japanese-to-sign-language-translation subsystem which translates voices from said videophone device into a sign language words train.

12. A sign language telephone system as claimed in claim 11, wherein said sign-language-to-Japanese-translation subsystem further comprises an answer phone control unit which generates a response message to a telephone call made using actual images input from said camera, sign language animations generated from said gesture to sign language animation conversion unit, an image selected from still pictures registered in a memory, Japanese character train obtained from translating the sign language to Japanese and voices generated from said voice synthesizing unit.

13. A sign language telephone system comprising:

a videophone device;

a television set;

a camera;

a microphone;
speakers;
sign language input means; and
a sign language telephone control device connected to said television set, said camera, said microphone, said speakers, said sign language input means, and operatively connected to said videophone via a network, which translates an input sign language from said sign language input means, generates synthesized voices for transmission to said videophone device via said network, recognizes voices from said videophone device, and generates a sign language animation based on recognized voices for a visual display, said sign language telephone control device comprising:
   a sign-to-language-to-Japanese-translation subsystem operable in an actual image mode, an animation mode, a suppression mode, and comprising:
      a sign language recognition unit which recognizes and translates the input sign language into a sign language words train;
      a sign-language-to-Japanese-translation unit which translates the sign language words train into Japanese;
      a voice synthesizing unit which synthesizes the translated Japanese as voices;
      a gesture-to-sign-language animation conversion unit which generates sign language animations by using positional data of hand gestures from the input sign language as data to move animations; and
      an image, voice and character synchronizing unit which generates images and voices to be transmitted to said videophone device via said network by composing images, a character train and voices, while synchronizing the translated Japanese and the voices generated in said voice synthesizing unit; and
   a Japanese-to-sign-language-translation subsystem which translates voices from said videophone device into a sign language words train.

14. A sign language telephone system as claimed in claim 13, wherein said sign-language-to-Japanese-translation subsystem further comprises a videophone image generation unit which generates images to be sent to said videophone device via said network by adding Japanese characters recognized by said Japanese-to-sign-language-translation subsystem to images generated from said image, voice and character synchronizing unit.

15. A sign language telephone system comprising:
a videophone device;
a television set;
a camera;
a microphone;
speakers;
sign language input means; and
a sign language telephone control device connected to said television set, said camera, said microphone, said speakers, said sign language input means, and operatively connected to said videophone device via a network, which translates an input sign language from said sign language input means, generates synthesized voices for transmission to said videophone device via said network, recognizes voices from said videophone device, and generates sign language animations based on recognized voices for a visual display, said sign language telephone control device comprising:
   a sign-language-to-Japanese-translation subsystem comprising:
      a sign language recognition unit which recognizes and translates the input sign language into a sign language words train;
      a sign-language-to-Japanese-translation unit which translates the sign language words train into Japanese; and
      a voice synthesizing unit which synthesizes the translated Japanese as voices; and
   a Japanese-to-sign-language-translation subsystem comprising:
      a voice recognition unit which recognizes Japanese voices spoken from said videophone device via said network;
      a Japanese-to-sign-language-translation unit which translates the Japanese recognized into the sign language;
      a sign language animation generation unit which generates sign language animations based on the translated sign language; and
      an image, voice and character synchronizing unit which composes a character train, sign language animations and images while synchronizing with the translated Japanese, the sign language animations generated from said sign language animation generation unit and actual images transmitted from said videophone device via said network.

16. A sign language telephone system comprising:
a videophone device;
a television set;
sign language input means; and
a sign language telephone control device connected to said television set, said sign language input means, and operatively connected to said videophone device via a network, which translates an input sign language from said sign language input means, generates synthesized voices for transmission to said videophone device via said network, recognizes voices from said videophone device, and generates sign language animations based on recognized voices for a visual display, said sign language telephone control device comprising:
   a sign-language-to-Japanese-translation subsystem comprising:
      a sign language recognition unit which recognizes and translates the input sign language to a sign language words train;
      a sign-language-to-Japanese-translation unit which translates the sign language words train to Japanese;
      a voice synthesizing unit which synthesizes the translated Japanese as voices; and
      means which enables a visual display of the actual images received from said videophone device with the translated sign language and the sign language animations generated from said sign language animation generation unit on said television set; and a Japanese-to-sign-language-translation subsystem comprising:
         a voice recognition unit which recognizes Japanese voices spoken from said videophone device via said network;
         a Japanese-to-sign-language-translation unit which translates the Japanese recognized into the sign language; and
         a sign language animation generation unit which generates sign language animations based on the translated sign language.

17. A sign language telephone system as claimed in claim 16, wherein said sign language telephone control device further comprises at least 1 means out of 2 means shown below: one means is a display means to display 2 display areas as shown below on said television screen by turns: one is an image display area to display actual images transmitted from said videophone device and another is a display area to display said sign language animations generated from said sign language animation generation unit in recognizing the voices transmitted from said videophone device and translating to animations; and an enlargement means to enlarge the display area for the sign language animations generated from said sign language animation generation unit in recognizing the voices transmitted from said videophone device and translating to the sign language.

18. A sign language telephone system comprising:
   a display monitor;
   sign language input means; and
   a sign language telephone control device connected to said display monitor, and operatively connected to a remote telephone device via a network, which operates in one of a translation mode and a non-translation mode to translate an input sign language from said sign language input means into a character train of a designated language for transmission to said remote telephone device via said network, and which recognizes voice spoken from said remote telephone device via said network in said designated language for translating the recognized voice into a sign language for a visual display on said display monitor in one of a sign language animation and a character train.

19. A sign language telephone system as claimed in claim 18, wherein said sign language telephone control device comprising first and second translation subsystems for translations between the sign language input from said sign language input means by an aurally handicapped user and voice information spoken by a normal user from said remote telephone device.

20. A sign language telephone system as claimed in claim 19, wherein said first translation subsystem translates the sign language from said sign language input means by said aurally handicapped user into a character train of said designated language, synthesizes said character train into voice information in said designated language for transmission to said remote telephone device, provides a visual display of said character train on said display monitor to confirm whether the sign language input by said aurally handicapped user has been correctly translated, and converts hand gestures of the sign language from said sign language input means into sign language animations for a visual display on said display monitor.

21. A sign language telephone system as claimed in claim 19, wherein said second translation subsystem recognizes and translates voice information spoken by a normal user in said designated language into a character train of said designated language, converts the recognized voice information into a sign language for a visual display on said display monitor, and composes the recognized voice information with an image from a camera for transmission to said remote telephone device to confirm whether voice information spoken by said normal user has been correctly recognized.

22. A sign language telephone system as claimed in claim 19, wherein said first translation subsystem comprises:
   a sign language recognition unit which recognizes and translates the input sign language to a sign language words train;
   a translation unit which translates the recognized sign language words train into a character train of said designated language; and
   a voice synthesizing unit which synthesizes the translated language as voice information for transmission to said remote telephone device via said network.

23. A sign language telephone system as claimed in claim 22, wherein said first translation subsystem further comprises:
   a countenance recognition unit which recognizes a countenance of said aurally handicapped user captured by said camera; and
   a conversion unit which generates sign language animations based on positional data of hand gestures from said input sign language and the recognized countenance from said countenance recognition unit.

24. A sign language telephone system as claimed in claim 22, wherein said first translation subsystem further comprises a translation control unit which controls operation in one of a translation mode and a non-translation mode, including enabling translation of the sign language words train from the sign language recognition unit into said designated language during said translation mode; and terminating translation of the sign language words train into said designated language during said non-translation mode.

25. A sign language telephone system as claimed in claim 22, wherein said first translation subsystem further comprises means for enabling a visual display of an actual image captured from said camera during an actual image mode, said sign language animations during an animation mode; and one of a still image or no image during a suppression mode.

26. A sign language telephone system as claimed in claim 22, wherein said second translation subsystem comprises:
   a voice recognition unit which recognizes the voice information in said designated language from said remote telephone device via said network; and
   a translation unit which translates the voice information from said videophone device into a sign language words train for a visual display on said display monitor.

27. A sign language telephone system comprising:
   a videophone device;
   a camera;
   sign language input means; and
   a sign language telephone control device connected to said camera and said sign language input means, and operatively connected to said videophone device via a network, said sign language telephone control device including first and second translation subsystems for translations between the sign language and voice information,
   wherein said first translation subsystem comprises:
      a sign language recognition unit which recognizes and translates the input sign language to a sign language words train;
      a translation unit which translates the recognized sign language words train into a designated language;
      a voice synthesizing unit which synthesizes the translated language as voice information for transmission to said videophone device via said network;
      a countenance recognition unit which recognizes a countenance of user captured by said camera; and
      a conversion unit which generates sign language animations based on positional data of hand gestures from said input sign language and the recognized countenance from said countenance recognition unit; and wherein said second translation subsystem comprises:
  a voice recognition unit which recognizes the voice information in said designated language from said videophone device via said network; and
  a translation unit which translates the voice information from said videophone device into a sign language words train.

28. A sign language telephone network comprising:
  a network;
  a first videophone connected to said network, and equipped with sign language input means to input a sign language from an aurally handicapped user;
  a second videophone connected to said network, and equipped with at least a camera to capture an image of a normal user; and
  a sign language interpretation server connected to said network, which translates the sign language input form said first videophone, into a character train in a designated language for transmission to said second videophone via said network, and which translateds voice spoken from said second videophone into a sign language for a visual display on said first videophone,
  wherein said sign language interpretation server comprises first and second translation subsystems for translations between the sign language input from said first videophone by an aurally handicapped user and voice information spoken from said second videophone by a nomal user, via said network,
  wherein said first translation subsystem translates the sign language from said aurally handicapped user into a character train of said designated language, synthesizes said character train into voice information in said designated language for transmission to said second videophone, provides a visual display of said character train on said first videophone to confirm whether the sign language from said aurally handicapped user had been correctly translated, and converts hand gestures of the sign language into sign language animations for a visual display on said first videophone; and
  wherein said second translation subsystem recognizes and translates voice information spoken from said normal user in said designated language into a character train of said designated language, converts the recognized voice informtioninto a sign language for a visual display on said first videophone, and composes the recognized voice information with an image from said camera for transmission to said videophone to confirm whether voice information spoken from said normal user has been correctly recognized.

29. A sign language telephone network as claimed in claim 28, wherein said first translation subsystem comprises:
  a sign language recognition unit which recognizes and translates the input sign language to a sign language words train;
  a translation unit which translates the recognized sign language words train into a character train of said designated language; and
  a voice synthesizing unit which synthesizes the translated language as voice information for transmission to said remote telephone device via said network.

30. A sign language telephone network as claimed in claim 29, wherein said first translation subsystem further comprises:
  a countenance recognition unit which recognizes a countenance of said aurally handicapped user captured by said camera; and
  a conversion unit which generates sign language animations based on positional data of hand gestures from said input sign language and the recognized countenance from said countenance recognition unit.

31. A sign language telephone network as claimed in claim 30, wherein said first translation subsystem further comprises a translation control unit which controls operation in one of a translation mode and a non-translation mode, including enabling translation of the sign language words train from the sign language recognition unit into said designated language during said translation mode; and terminating translation of the sign language words train into said designated language during said non-translation mode.

32. A sign language telephone network as claimed in claim 29, wherein said second translation subsystem comprises:
  a voice recognition unit which recognizes the voice information in said designated language from said remote telephone device via said network; and
  a translation unit which translates the voice information from said videophone device into a sign language words train for a visual display on said display monitor.

33. A sign language telephone network as claimed in claim 31, wherein said first translation subsystem further comprises means for enabling a visual display of an actual image captured from said camera during an actual image mode, said sign language animations during an animation mode; and one of a still image or no image during a suppression mode.

* * * * *